(12) United States Patent
Nam et al.

(10) Patent No.: US 11,080,508 B2
(45) Date of Patent: Aug. 3, 2021

(54) DISPLAY CAPABLE OF DETECTING FINGERPRINT

(71) Applicant: ARCSOFT CORPORATION LIMITED, Hangzhou (CN)

(72) Inventors: Dong Wook Nam, Suwon-si (KR); Byung Il Min, Suwon-si (KR); Kwang Sue Park, Seoul (KR); Bong Seok Kim, Gwangju-si (KR)

(73) Assignee: ARCSOFT CORPORATION LIMITED, Hangzhou (CN)

( * ) Notice: Subject to any disclaimer, the term of this patent is extended or adjusted under 35 U.S.C. 154(b) by 0 days.

(21) Appl. No.: 16/769,834

(22) PCT Filed: Dec. 4, 2018

(86) PCT No.: PCT/KR2018/015225
§ 371 (c)(1),
(2) Date: Jun. 4, 2020

(87) PCT Pub. No.: WO2019/112282
PCT Pub. Date: Jun. 13, 2019

(65) Prior Publication Data
US 2021/0174053 A1    Jun. 10, 2021

(30) Foreign Application Priority Data

Dec. 4, 2017 (KR) .......... 10-2017-0165306
Mar. 10, 2018 (KR) .......... 10-2018-0028332
(Continued)

(51) Int. Cl.
*G06K 9/00* (2006.01)
(52) U.S. Cl.
CPC ....... *G06K 9/00046* (2013.01); *G06K 9/0004* (2013.01)

(58) Field of Classification Search
None
See application file for complete search history.

(56) References Cited

U.S. PATENT DOCUMENTS 5,863,114 A    1/1999    Nagatani et al.
9,829,733 B2   11/2017   Seen et al.
(Continued)

FOREIGN PATENT DOCUMENTS

KR    10-2012-0063192    6/2012
KR    10-1602306         3/2016
(Continued)

OTHER PUBLICATIONS

English translation of International Search Report from corresponding PCT Appln. No. PCT/KR2018/015225, dated Mar. 12, 2019.
(Continued)

*Primary Examiner* — Nicholas J Lee
(74) *Attorney, Agent, or Firm* — Kevin J. Carroll; Grossman, Tucker, Perreault & Pfleger, LLC

(57) ABSTRACT

A semiconductor package including a prism sheet having dam structure disclosed. The semiconductor package includes a case having a wall configured for surrounding a space in which a semiconductor chip is installed, and a prism sheet having a prism surface consisting of a plurality of prism peaks and a plurality of prism valleys and a flat surface facing the prism surface, wherein the prism surface faces the semiconductor chip and the flat surface is coupled to a cover, wherein a dam extending in a direction different from an extending direction of the prism peak is formed on the prism surface.

11 Claims, 26 Drawing Sheets

(30) Foreign Application Priority Data

Apr. 13, 2018 (KR) .................. 10-2018-0043490
Jun. 22, 2018 (KR) .................. 10-2018-0071849

(56) References Cited

U.S. PATENT DOCUMENTS

| | | | |
|---|---|---|---|
| 10,116,868 B2 | 10/2018 | Wyrwas | |
| 2013/0034274 A1* | 2/2013 | Wu | G06K 9/00046 382/124 |
| 2013/0119237 A1* | 5/2013 | Raguin | H01L 27/14601 250/208.1 |
| 2013/0120760 A1* | 5/2013 | Raguin | G06K 9/0004 356/612 |
| 2017/0270342 A1* | 9/2017 | He | G06F 21/32 |
| 2017/0286742 A1* | 10/2017 | Mackey | G06K 9/0008 |
| 2018/0036997 A1* | 2/2018 | Shimizu | G02B 6/0088 |

FOREIGN PATENT DOCUMENTS

| | | |
|---|---|---|
| KR | 10-2016-0048646 | 5/2016 |
| KR | 10-2016-0147943 | 12/2016 |
| KR | 10-2017-0125455 | 11/2017 |

OTHER PUBLICATIONS

English translation of the Written Opinion from corresponding PCT Appln. No. PCT/KR2018/015225, dated Mar. 12, 2019.

* cited by examiner

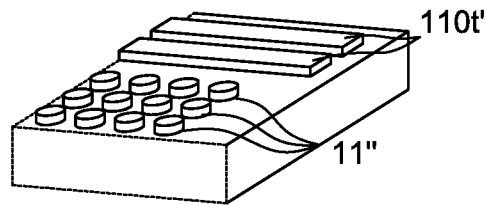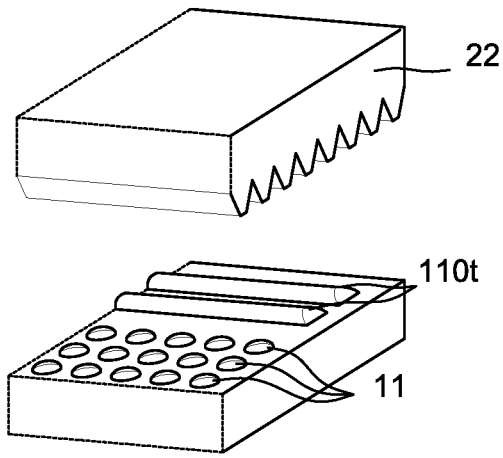
FIG. 12A  FIG. 12B

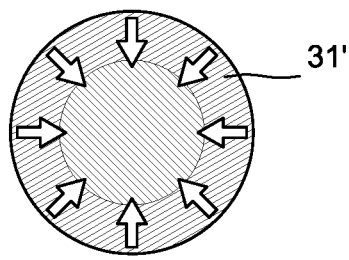
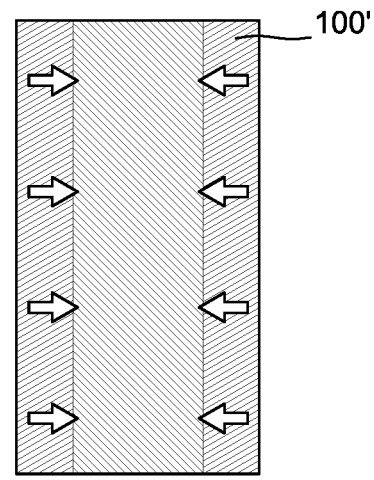
FIG. 13A
FIG. 13B
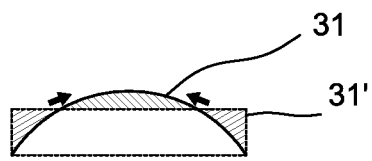
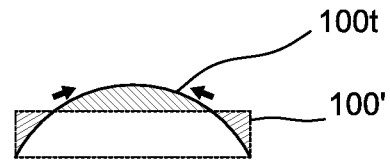
FIG. 13C
FIG. 13D

DISPLAY CAPABLE OF DETECTING FINGERPRINT

FIELD

The invention relates to a display.

BACKGROUND

A fingerprint sensor captures an image of a fingerprint and converts the captured image into an electrical signal. In order to captures a fingerprint image, a conventional optical fingerprint sensor includes an optical system that irradiates a fingerprint with light to allow the fingerprint to reflect the light. However, since the optical system including a prism, a specular mirror, and a lens has generally a considerable volume, it is difficult to decrease the size of an electronic device including the optical fingerprint sensor.

On the other hand, the number of types of electronic devices and the number of electronic devices which have a fingerprint sensor coupled thereto have increased like portable electronic devices such as mobile phones and tablets. In order to attach a fingerprint sensor to the front surface of an electronic device, it is necessary to expose a sensing portion of the fingerprint sensor in contact with a fingerprint to the outside. Accordingly, when a whole of the front surface of an electronic device is covered with a protective medium such as a glass cover or a transparent film in order to protect a display panel or due to its own design, it is difficult to attach a fingerprint sensor employing a capacitive method of sensing change in capacitance to the front surface of an electronic device. It is also difficult to locate the fingerprint sensor under a display panel.

Electronic circuits formed on a silicon wafer are diced into a plurality of chips and then packaged. Packaging is for having the chip be electrically coupled to outside and at the same time protecting the chip. Traditionally, the package used to accommodate one semiconductor chip. Recently, a new need such as placing or stacking more than two of semiconductor chips in a single package or stacking a non-semiconductor structure on a semiconductor chip arises. Since conventional packages are designed to accommodate a single semiconductor chip, it is not suitable to stack semiconductor chip or non-semiconductor structure.

In order to seal the package for protecting stacked semiconductor chips or non-semiconductor structure, a package cover should be coupled to a lower structure of package by adhesive. When pressing the package cover after applying adhesive, a small amount of adhesive may flow into the stacked semiconductor chips or non-semiconductor structure. In case that the non-semiconductor structure is an optical structure, it may have a bad effect on a normal operation of the package.

Especially, in case of non-semiconductor structure, there will be a need to be aligned with the semiconductor chip to be arranged below. Although it is possible to align within several tens of micrometers by using a machine vision, it is not easy to align in a structure in which the machine vision is not available or in another structure in which the package should be sealed right after a process of stacking.

SUMMARY

There is provided a display configured for generating a fingerprint image by use of a display panel as a light source in an environment in which an intensity of ambient light is very low, and by use of ambient light in other environments. The ambient light and light from display panel may be diffused throughout a skin of finger.

Ridges of finger may be in contact with a glass cover, but valleys of finger may not be in contact with the glass cover. Since difference in refractive indexes between skin and the glass cover is relatively smaller than difference in refractive indexes between air and the glass cover, a range of incidence angle of ray of light incident on the glass cover directly from the ridge is different from a range of incidence angle of ray of light incident on the glass cover from the valley through air. It is possible to generate the fingerprint image with ray of light that cannot come from the valley based on a principle that incidence angle of ray of light incident on the glass cover can be limited due to refractive indexes between skin and the glass cover.

One embodiment according to one aspect of the present invention provides a display capable of detecting fingerprint. The display capable of detecting fingerprint includes a display panel consisting of a top surface to be coupled to a glass cover and a bottom surface on which a prism surface having alternately-arranged a plurality of prism valleys and a plurality of prism peaks and configured for refracting ray of light at various incidence angles representing ridges and valleys of a finger contacting the glass cover, and an image sensor layer being arranged below the display panel and configured for detecting a target ray of light having a target incidence angle out of rays of light having various incidence angles.

In one embodiment, the image sensor layer includes a micro lens array being arranged in the plurality of prism valleys and configured for refracting rays of light that are refracted by the prism surface, an optical path extending layer being arranged below the micro lens array, and an image sensor being arranged below the optical path extending layer and configured for detecting rays of light that are refracted by the micro lens array to output a pixel current, wherein an optical path through which the target ray of light propagates from the micro lens array to the image sensor may be inclined.

In one embodiment, the display capable of detecting fingerprint may further include an alignment bar being formed to extend in a lengthwise direction of the prism valley on a top surface of the optical path extending layer, wherein the alignment bar is formed to be spaced from the micro lens array, wherein the image sensor layer may be accommodated inside of the prism valley.

In one embodiment, more than two alignment bars may be formed on each side of the micro lens array.

In one embodiment, the micro lens array and the alignment bar may be formed simultaneously by reflow.

In one embodiment, the prism surface may be formed by attaching the prism sheet on a bottom surface of the display panel.

In one embodiment, the display panel may include a substrate on which a plurality of pixels are formed and the prism surface may be formed on the bottom surface of the substrate.

In one embodiment, the plurality of prism peaks and the plurality of prism valleys are formed by a plurality of first inclined faces and a plurality of second inclined faces that are alternately arranged, wherein the first inclined face refracts the target ray of light at a first angle out of rays of light having various incidence angles, wherein an incidence angle of the first inclined face and an incidence angle of the second inclined face may be substantially identical.

In one embodiment, the plurality of prism peaks and the plurality of prism valleys are formed by a plurality of first inclined faces and a plurality of second inclined faces that are alternately arranged, wherein the first inclined face refracts the target ray of light at a first angle out of rays of light having various incidence angles, wherein an incidence angle of the first inclined face and an incidence angle of the second inclined face may be different from each other.

In one embodiment, a top end of the first inclined face is connected to a top end of the second inclined face, and a bottom end of the first inclined face and a bottom end of the second inclined face are respectively connected to each end of a bottom surface that extends in a parallel direction.

One embodiment according to another aspect of the present invention provides a semiconductor package having self-aligned structure. The semiconductor package includes a semiconductor chip or an image sensor or a fingerprint image sensor having an active area and at least one marginal area that is located around the active area, wherein an alignment bar is arranged on the marginal area in a lengthwise direction, and a top structure being arranged on the semiconductor chip or the image sensor or the fingerprint image sensor and having a groove being formed on a bottom surface, wherein the groove extends in the lengthwise direction and is configured for accommodating the alignment bar.

In one embodiment, at least two alignment bars may be formed on the marginal area.

In one embodiment, the alignment bars may be formed on marginal areas locating on each side of the active area.

In one embodiment, the alignment bar may include at least two bar segments arranged along a same line.

In one embodiment, the semiconductor package may further include a micro lens array consisting of a plurality of micro lens formed above the active area.

In one embodiment, the semiconductor package may further include an optical path extending layer being arranged on a top surface of the semiconductor chip for covering a whole of the active area and at least portion of the marginal area, wherein the micro lens array and the alignment bar may be formed on the optical path extending layer.

In one embodiment, the micro lens array and the alignment bar may be simultaneously formed by reflow.

In one embodiment, the alignment bar may be formed on the marginal area with being spaced from the micro lens array by n (n is natural number) times of micro lens pitch.

In one embodiment, at least two alignment bars formed on same marginal area may be spaced from each other by the micro lens pitch.

In one embodiment, at least two alignment bars formed on same marginal area may be spaced from each other by a pitch different from the micro lens pitch.

In one embodiment, a height of the micro lens and a height of the alignment bar may be different from each other.

In one embodiment, a diameter of the micro lens and a width of the alignment bar may be identical.

In one embodiment, the top structure may be a prism sheet including a plurality of the first inclined faces and a plurality of the second inclined faces that are alternately arranged to form the plurality of prism peaks and the plurality of prism valleys, and the groove may be the prism valley.

One embodiment according to still another aspect of the present invention provides a semiconductor package having self-aligned structure. The semiconductor package includes a semiconductor chip having an active area and at least one marginal area that is located around the active area, an optical path extending layer being arranged on a top of the semiconductor chip to cover the active area and at least portion of the marginal area, having a micro lens array consisting of a plurality of micro lens formed on a first area corresponding to the active area and an alignment bar formed on a second area corresponding to the marginal area, and a top structure being arranged above the optical path extending layer and having a groove extending in a lengthwise direction and being configured for accommodating the alignment bar formed on a bottom surface.

In one embodiment, at least two alignment bars may be formed on the second area.

In one embodiment, the alignment bars may be formed on the second areas locating on each side of the first area.

In one embodiment, the micro lens array and the alignment bar may be simultaneously formed by reflow.

In one embodiment, the alignment bar may be formed on the second area with being spaced from the micro lens array by n times of micro lens pitch.

In one embodiment, at least two alignment bars formed on same second area may be spaced from each other by the micro lens pitch.

In one embodiment, at least two alignment bars formed on same second area may be spaced from each other by a pitch different from the micro lens pitch.

In one embodiment, the top structure may be a prism sheet including a plurality of the first inclined faces and a plurality of the second inclined faces that are alternately arranged to form the plurality of prism peaks and the plurality of prism valleys, and the groove may be the prism valley.

In one embodiment, the top structure may be a prism sheet including a plurality of the first inclined faces and a plurality of the second inclined faces that are alternately arranged to form the plurality of prism peaks and the plurality of prism valleys, a top end of the first inclined face is connected to a top end of the second inclined face, and a bottom end of the first inclined face and a bottom end of the second inclined face are respectively connected to each end of a bottom surface that extends in a parallel direction, and the groove may be the prism valley.

One embodiment according to still another aspect of the present invention provides a method of manufacturing a semiconductor package having self-aligned structure. The method includes forming a plurality of micro lens patterns and an alignment bar pattern on an optical path extending layer, forming a micro lens array and an alignment bar by reflowing the plurality of micro lens patterns and the alignment bar pattern, arranging the optical path extending layer on a top surface of a semiconductor chip having an active area and at least one marginal area around the active area, and arranging a top structure having a groove being formed to extend in a lengthwise direction on a bottom surface of the top structure on the optical path extending layer.

In one embodiment, the plurality of micro lens patterns and the alignment patter may be formed of same material.

In one embodiment, the plurality of micro lens patterns may be formed on a first area of the top surface of the optical path extending layer corresponding to the active area, and the alignment bar patter may be formed on a second area of the top surface of the optical path extending layer corresponding to the marginal area.

One embodiment according to still another aspect of the present invention provides a semiconductor package having self-aligned structure. The semiconductor package includes a semiconductor having an active area, an optical path extending layer being arranged on a top of the semiconductor chip to cover at lease portion of the active area, having a micro lens array consisting of a plurality of micro lens formed on a first area corresponding to the active area and an alignment bar formed on at least one second area being located around the first area, and a top structure being arranged above the optical path extending layer and having a groove extending in a lengthwise direction and being configured for accommodating the alignment bar formed on a bottom surface.

In one embodiment, at least two alignment bars may be formed on the second area.

In one embodiment, the alignment bars may be formed on the second areas locating on each side of the first area.

In one embodiment, the micro lens array and the alignment bar may be simultaneously formed by reflow.

In one embodiment, the alignment bar may be formed on the second area with being spaced from the micro lens array by n times of micro lens pitch.

In one embodiment, at least two alignment bars formed on same second area may be spaced from each other by the micro lens pitch.

In one embodiment, at least two alignment bars formed on same second area may be spaced from each other by a pitch different from the micro lens pitch.

One embodiment according to still another aspect of the present invention provides a semiconductor package including a prism sheet having dam structure. The semiconductor package may include a case having a wall configured for surrounding a space in which a semiconductor chip is installed, and a prism sheet having a prism surface consisting of a plurality of prism peaks and a plurality of prism valleys and a flat surface facing the prism surface, wherein the prism surface faces the semiconductor chip and the flat surface is coupled to a cover, wherein a dam extending in a direction different from an extending direction of the prism peak is formed on the prism surface.

In one embodiment, the extending direction of the dam is perpendicular to the extending direction of the prism peak.

In one embodiment, the dam may be formed in the plurality of prism valleys.

In one embodiment, the dam may be formed close to a lateral surface of the prism sheet.

In one embodiment, a height of the dam may be the same as a height of the prism peak.

In one embodiment, a cross-section of the dam may be a triangle.

In one embodiment, a cross-section of the dam may be a rectangle.

In one embodiment, a length of the dam in the extending direction may be shorter than the prism sheet.

In one embodiment, the semiconductor chip may be an image sensor.

In one embodiment, the semiconductor package may further include an optical path extending layer arranged on a top surface of the semiconductor chip, and a micro lens array arranged on a top surface of the optical path extending layer.

In one embodiment, the plurality of prism peak and the plurality of prism valleys may be formed by a plurality of first inclined faces and a plurality of second inclined faces that are alternately arranged, wherein an inclination angle of the first inclined face and an inclination angle of the second inclined face are different from each other.

BRIEF DESCRIPTION OF THE DRAWINGS

Hereinafter, embodiments of the invention will be described with reference to the accompanying drawings. For the purpose of easy understanding of the invention, the same elements will be referred to by the same reference signs. Configurations illustrated in the drawings are examples for describing the invention, and do not restrict the scope of the invention. Particularly, in the drawings, some elements are slightly exaggerated for the purpose of easy understanding of the invention. Since the drawings are used to easily understand the invention, it should be noted that widths, thicknesses, and the like of elements illustrated in the drawings might change at the time of actual implementation thereof.

FIGS. 12A and 12B illustrate a method of forming the alignment bar shown in FIG. 10;

FIGS. 13A, 13B, 13C and 13D illustrate reflow of micro lens pattern and alignment bar pattern shown in FIG. 11;

DETAILED DESCRIPTION

Figure 1:
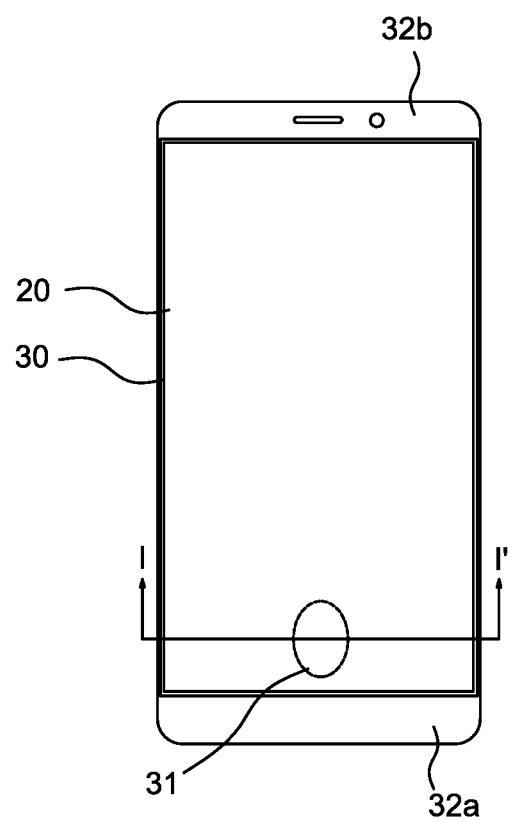
FIG. 1 is a diagram schematically illustrating a part of a display of an electronic device to which a display having a fingerprint recognition function is coupled.

Embodiments which will be described below with reference to the accompanying drawings can be implemented singly or in combination with other embodiments. But this is not intended to limit the present invention to a certain embodiment, and it should be understood that all changes, modifications, equivalents or replacements within the spirits and scope of the present invention are included. Especially, any of functions, features, and/or embodiments can be implemented independently or jointly with other embodiments. Accordingly, it should be noted that the scope of the invention is not limited to the embodiments illustrated in the accompanying drawings.

On the other hand, among terms used in this specification, terms such as "substantially," "almost," and "about" are used to take consideration of a margin or an error at the time of actual embodiment. For example, "substantially 90 degrees" should be construed to include angles at which the same advantages as at 90 degrees can be expected. For example, "almost zero" should be construed to include a quantity which is slightly present but is ignorable.

On the other hand, unless otherwise mentioned, "side" or "horizontal" is used to mention a right-left direction in the drawings, and "vertical" is used to mention an up-down direction in the drawings. Unless otherwise defined, an angle, an incidence angle, and the like are defined with respect to a virtual straight line perpendicular to a horizontally flat surface illustrated in the drawings.

In the accompanying drawings, the same or similar elements will be referred to by the same reference numerals.

FIG. 1 is a diagram schematically illustrating a part of a display of an electronic device to which a display having a fingerprint recognition function is coupled.

Figure 10:
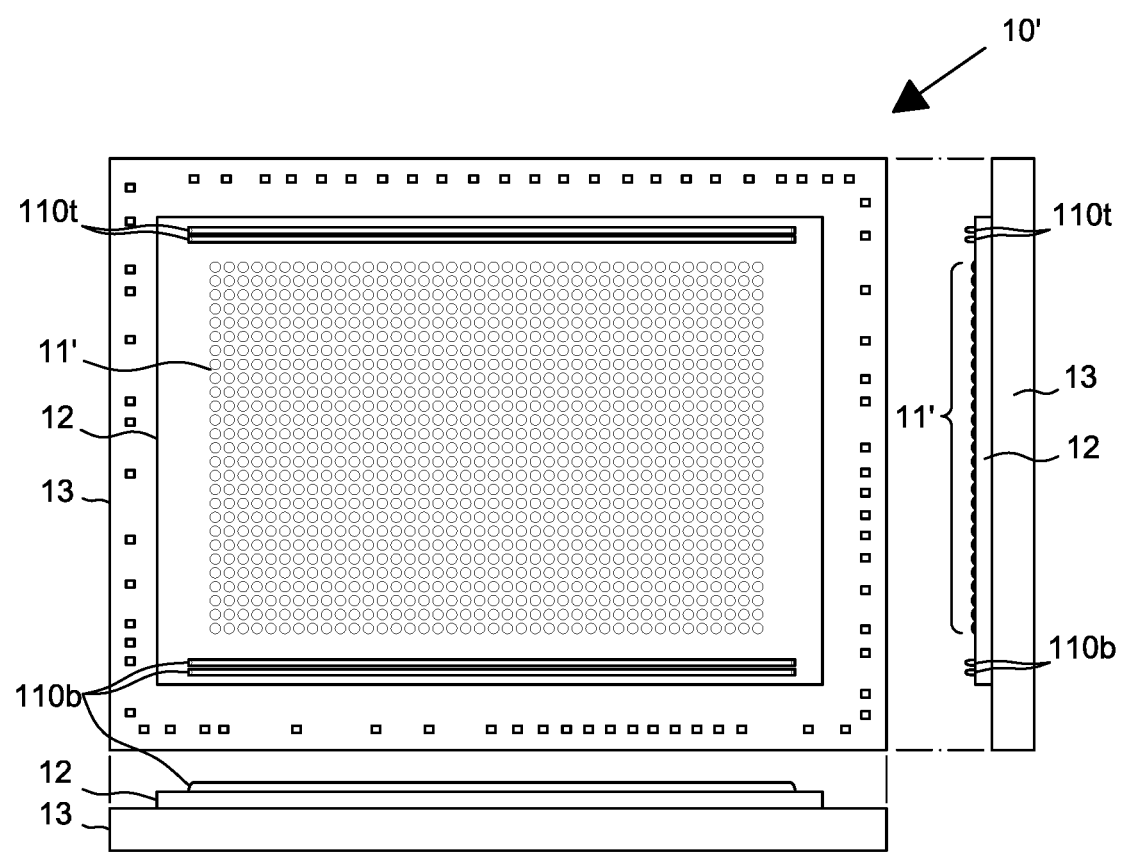
FIG. 10 illustrates a semiconductor chip having an alignment bar for coupling to a top structure.

An electronic device may include a display 20 and an image sensor layer 10 or a fingerprint image sensor (10' in FIG. 10). The image sensor layer 10 or the fingerprint image sensor 10' is capable of generating a fingerprint image by capturing an image of a fingerprint of finger 50 positioned on a glass cover 30 arranged thereabove. The display 20 includes a display panel 21 having a prism surface 22. The image sensor layer 10 may be formed on or coupled to a portion or a whole of the prism surface to generate the fingerprint image at an arbitrary location. The fingerprint image sensor 10' may be arranged on a bottom surface of the display panel 21 and generate the fingerprint image at the arranged location. Except an area occupying on the bottom surface of the display panel 21, the location on where the fingerprint image can be generated, and/or the way of attaching to the display panel 21, the image sensor layer 10 and the fingerprint image sensor 10' have substantially identical principle and structure, hereinafter the image sensor layer 10 will be described mainly.

FIG. 1 illustrates a smartphone of which a glass cover 30 is coupled to the front surface thereof as an example of the electronic device. Upper and lower coated areas 32a and 32b that define areas for exposing a display 20 are formed on or below the bottom surface of the glass cover 30. On the other hand, right and left coated areas (not illustrated) may be connected to both ends of the upper and lower coated areas 32a and 32b depending on the type of the electronic device. The display 20 having a relatively large area and a speaker, a camera, and/or a sensor having a relatively small area can be arranged on the front surface of the electronic device. The glass cover 30 covers a whole of display 20, or may cover a portion or the whole of the front surface of the electronic device depending on the type of the electronic device. The display 20 is located below the glass cover 30, and an image sensor layer 10 is located below the display 20.

The image sensor layer 10 may be configured to generate the fingerprint image by use of light that the display panel generates 21 (hereinafter 'panel light') and/or an ambient light. The ambient light is direct light or reflected light from sun or any artificial lightings, other than the panel light. Like the panel light, the ambient light may include light in a range between red and near-infrared that can be diffused through a skin of finger.

Figure 2A:
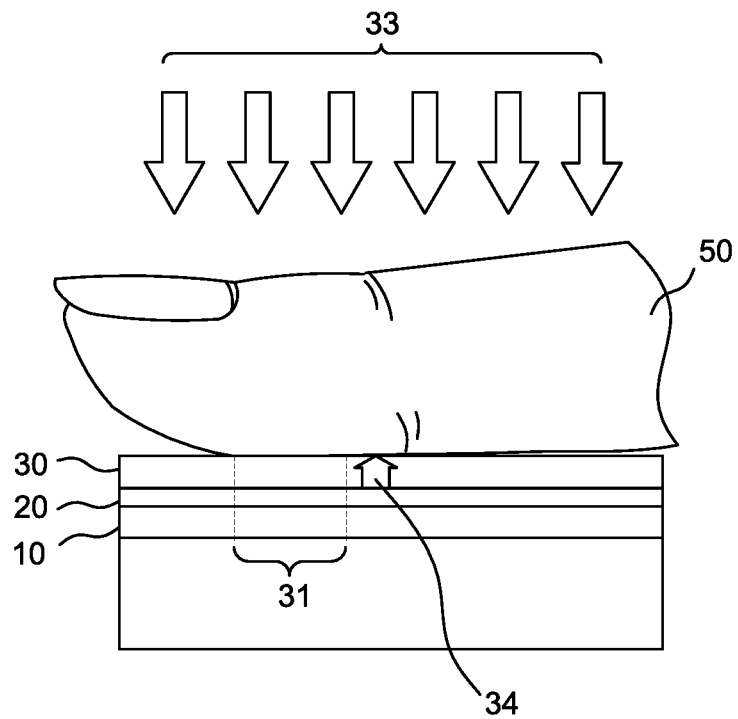
FIGS. 2A and 2B illustrate a concept of generating fingerprint image in diffusion method by use of panel light or ambient light.
Figure 2B:
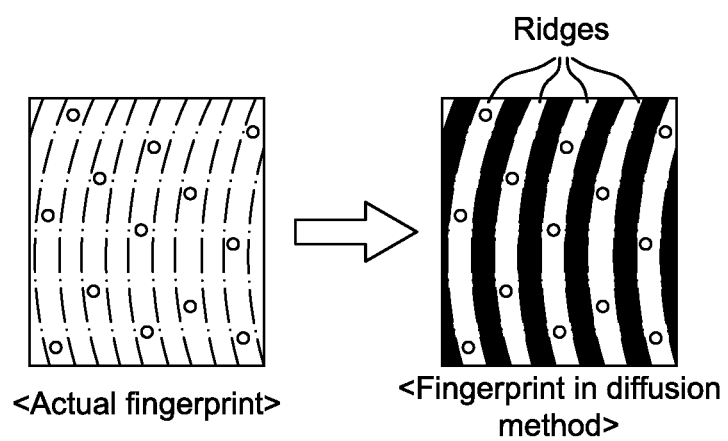

FIGS. 2A and 2B illustrate a concept of generating fingerprint image in diffusion method by use of panel light or ambient light.

Referring FIGS. 2A and 2B, the diffusion method can generate the fingerprint image by use of a phenomenon that the panel light 34 generated by display panel 21 or the ambient light 33 can be diffused through skin. When a ridge of fingerprint contacts the glass cover 30, light that is diffused through skin can be incident on the glass cover 30 at a contact point between the glass cover 30 and the ridge. The contact point may serve as an infinite point light source. On the other hand, light emitted from a valley of fingerprint is refracted at a limited angle because it is incident on the glass cover 30 through an interface between air and the glass cover 30. Thus there exists a non-overlapped range between incidence angle of light from the ridge and incidence angle of light from the valley, and a target incidence angle may be selected from the non-overlapped range. Since the light from the ridge of fingerprint is detected, the ridge appears relatively brighter and the valley appears relatively darker in the fingerprint image according to the diffusion method. The scheme of generating fingerprint image by diffusion method will be described in detail with reference to FIGS. 3, 6 through 8.

In one embodiment, a light source for generating the panel light 34 needed to generate the fingerprint image may be the display panel 21. The display panel 21 may generate the panel light 34 incident on the finger by turning a combination of R, G, and B pixels on. The panel light 34 may be a visible light such as a white light or a red light. Meanwhile, although FIG. 2A illustrates the panel light 34 perpendicularly incident on the finger 50, this is for a brief representation and is not intended to limit a direction of the panel light 34 to a perpendicular direction. When the finger 50 is positioned on a fingerprint acquisition area 31 on the display panel 21 of the electronic device, a combination of R, G and B pixels locating under or outside of the fingerprint acquisition area 31 may turn on.

In another embodiment, the display can generate the fingerprint image with the ambient light only, in an environment in which an intensity of light enough to generate fingerprint image is provided by the ambient light, for example, in outdoor. Meanwhile, although FIG. 2A illustrates the ambient light 33 perpendicularly incident on the finger 50, this is for a brief representation and is not intended to limit a direction of the ambient light 33 to a perpendicular direction. A display driver configured for driving the display panel 21 and/or an application processor of the electronic device may obtain a measurement indicating brightness of ambient light from an illuminance sensor, and may determine whether using the display panel 21 as the light source based on the measurement. For example, if it is possible to generate the fingerprint image only with the ambient light, the display driver and/or the application processor may not turn on the combination of R, G, and B pixels locating under or outside of the fingerprint acquisition area 31.

FIGS. 3A, 3B, 3C and 3D are diagrams schematically illustrating an operation principle of generating the fingerprint image in the diffusion method, where a part of the fingerprint acquisition area 31 illustrated in FIG. 1 is enlarged.

Figure 3A:
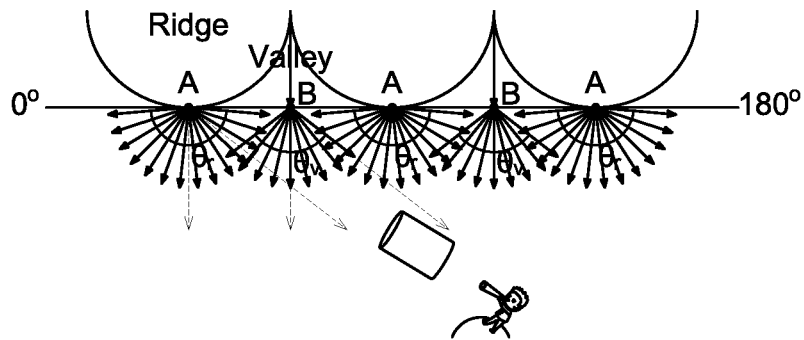
FIGS. 3A, 3B, 3C and 3D are diagrams schematically illustrating an operation principle of generating the fingerprint image in the diffusion method.

Referring to FIG. 3A, the image sensor layer 10 has a structure in which only rays of light having a target incidence angle out of rays of light incident on the image sensor layer 10 from ridges of a fingerprint arrive at the light receiving portions of the image sensor layer 10 and rays of light having angles other than the target incidence angle do not arrive at the light receiving portions. That is, when rays of light are incident on the skin, the rays of light serve as infinite point light sources at the skin of the finger 50. When the finger is positioned on the glass cover 30, a part in contact with the glass cover 30 such as ridges of the fingerprint and a part not in contact with the glass cover 30 such as valleys of the fingerprint emit rays of light having different incidence angles to the glass cover 30. Specifically, rays of light emitted from the valleys of the fingerprint passes through air interposed between the skin and the glass cover 30 and is then incident on the glass cover 30. Accordingly, the range of incidence angles of the rays of light emitted from the valleys of the fingerprint is narrower than the range of incidence angles of rays of light incident on the glass cover 30 from the ridges of the fingerprint. A fingerprint image can be generated using rays of light having an incidence angle which are emitted from only the ridges of the fingerprint except for rays of light having the common range of incidence angles. This principle will be described below in detail with reference to FIGS. 3B through 3D.

Figure 3B:
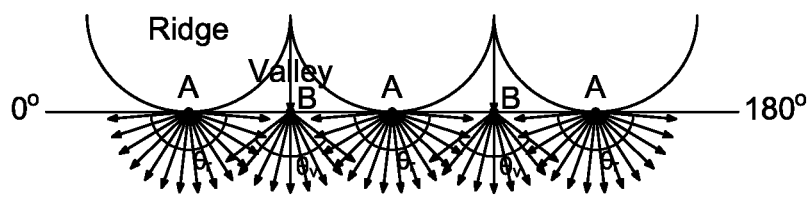

Referring to FIG. 3B, a fingerprint includes ridges and valleys, the ridges come into contact with the top surface of the glass cover 30, and the valleys do not come into contact with the top surface of the glass cover 30. A protective medium is an optically-transparent medium which can transmit rays of light and prevents damages on the outer surface of the electronic device. An example of the protective medium is the glass cover 30 that is coupled to the front surface of a mobile phone and protects the display panel 21. In the following description, it is assumed that the glass cover 30 is an example of the protective medium.

The ridges and the valleys of a fingerprint serve as multiple light sources that apply rays of light from the top surface of the glass cover 30 to the light receiving portions of the image sensor layer 10. Points A at which the ridges come in contact with the top surface of the glass cover 30 serve as light sources, emit rays of light in all directions, and applies rays of light from the top surface of the glass cover 30 to the inside of the glass cover 30. On the other hand, rays of light emitted from the valleys which are not in contact with the top surface of the glass cover 30 arrive at Points B on the top surface of the glass cover 30 through air between the valleys and the glass cover 30 and thus the rays of light are refracted at Points B. Accordingly, glass cover incidence angles $\theta_r$ of the rays of light which are incident on the glass cover 30 from Points A belong to a range of about 0 degrees to about 180 degrees, and glass cover incidence angles $\theta_v$ of the rays of light which are incident on the glass cover 30 at Points B belong to a relatively narrow range in comparison with the glass cover incidence angles $\theta_r$ due to a difference between a refractive index of air and a refractive index of the glass cover. Here, it is assumed that the glass cover incidence angle of rays of light directed to the left to be substantially parallel to the top surface of the glass cover 30 is 0 degrees, the glass cover incidence angle of rays of light which are incident on the top surface of the glass cover 30 to be substantially perpendicular thereto is 90 degrees, and the glass cover incidence angle of rays of light which are directed to the right to be substantially parallel to the top surface of the glass cover 30 is 180 degrees. Here, the angle of a ray of light which is incident on the glass cover 30 is defined as the glass cover incidence angle.

The image sensor layer 10 is coupled to the bottom surface of the display panel 21. Unlike an LCD which requires an additional structure for generating rays of light such as a backlight or a reflector on the bottom surface of the display panel 21, an AMOLED or a quantum dot display does not require an additional structure because a unit pixel generates a ray of light by itself. On the other hand, electrodes and/or wirings occupying a considerable portion of a unit pixel area of the display panel 21 are formed of opaque material such as metal, and can be spaced from or stacked on each other by use of optically transparent material such as IMD for electrical isolation. Due to transparent material, a region or a space that light can pass through exists between electrodes and/or wirings. Accordingly, the display panel 21 interposed between the glass cover 30 and the image sensor layer 10 can provide an extended optical path through which rays of light input from the glass cover 30 can pass. In other words, substantially the same results as those of forming the image sensor layer 10 on the bottom surface of a glass cover thicker than a general glass cover can be expected. As will be described below in detail, the image sensor layer 10 has a structure for selecting an incidence angle of a ray of light to be detected. Accordingly, even when a phenomenon in which rays of light input from the display panel 21 are refracted to a certain extent occurs, rays of light having the target incidence angle can be detected below the display panel 21 by adjusting one or more conditions for selecting the target incidence angle of rays of light.

Figure 3C:
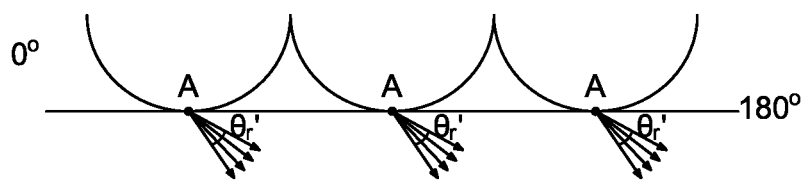
Figure 3D:
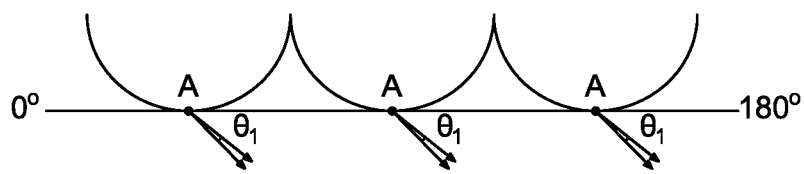

The image sensor layer 10 coupled to a prism surface 22 selects rays of light having a predetermined target incidence angle $\theta_1$ out of rays of light which are incident on the top surface of the image sensor layer 10 through the glass cover 30 and the display panel 21. The prism surface 22 and a micro lens 11 form a light selection structure. FIG. 3C illustrates rays of light having an incidence angle $\theta_{r'}$ which is selected by the light selection structure out of rays of light incident on the top surface of the image sensor layer 10, and FIG. 3D illustrates rays of light having the target incidence angle $\theta_1$ which finally arrive at the light receiving portions of the image sensor out of rays of light having the incidence angle $\theta_{r'}$. That is, the light selection structure selects rays of light having the target incidence angle by directing rays of light having a predetermined incidence angle to the bottom of the image sensor layer 10 at which the light receiving portions are located. In the following description, a ray of light having the target incidence angle $\theta_1$ is referred to as a target ray of light.

Specifically, in FIG. 3C, the light selection structure blocks rays of light incident on the left sides of Points A and Points B out of rays of light incident on the image sensor layer 10 and additionally blocks rays of light having the same incidence angle as the incidence angle of rays of light incident on the right side of Points B out of rays of light incident on the right side of Points A. Accordingly, rays of light having the incidence angle $\theta_{r'}$ can be selected. For example, when a glass cover incidence angle $\theta_r$ belongs to a range of about 0 degrees to about 180 degrees and a glass cover incidence angle $\theta_v$ belongs to a range of about 42 degrees to about 132 degrees, the incidence angle $\theta_{r'}$ belongs to a range of about 132 degrees to about 140 degrees, which is merely an example and can vary depending on characteristics of the light selection structure.

In FIG. 3D, rays of light having the target incidence angle $\theta_1$ to be incident on the light receiving portions can be selected out of rays of light selected by the light selection structure. For example, when the incidence angle $\theta_r$ belongs to a range of 132 degrees to 140 degrees, the target incidence angle $\theta_1$ belongs to a range of 135 degrees to 140 degrees, which is merely an example and can vary depending on characteristics of the light selection structure such as positions, diameters, and sizes of micro lenses. Here, the rays of light having the target incidence angle $\theta_1$ are refracted while passing through the light selection structure, and the angle $\theta r$ at the time of finally arriving at the light receiving portions can be different from the target incidence angle $\theta_1$. In FIGS. 3C and 3D, a structure for blocking rays of light incident on the left of Points A and generating a fingerprint image is illustrated, and substantially the same fingerprint image can be generated with a structure for blocking rays of light incident on the right of Points A.

Since the target incidence angle $\theta_1$ is an angle which can be taken by only rays of light generated from the ridges of the fingerprint, a clear fingerprint image having a high ratio of contrast can be generated using the target incidence angle $\theta_1$. As illustrated in FIG. 3B, when the fingerprint is positioned on the glass cover 30, rays of light from the valleys in addition to rays of light from the ridges are incident on the glass cover. Since an optical fingerprint sensor according to the related art has a structure for detecting rays of light which are incident perpendicularly, rays of light which are incident substantially perpendicularly on the top surfaces of the light receiving portions from the valleys are detected in addition to rays of light which are incident substantially perpendicularly on the top surfaces of the light receiving portions from the ridges. Accordingly, a fingerprint image in which a boundary between a ridge and a valley of the fingerprint is not clear is generated. On the other hand, since the display capable of detecting fingerprint according to the invention has a structure for detecting only at least a portion of rays of light based on the ridges out of rays of light generated based on a contact surface of a fingerprint, it is possible to generate a clearer fingerprint image than the optical fingerprint sensor according to the related art does.

Figure 4:
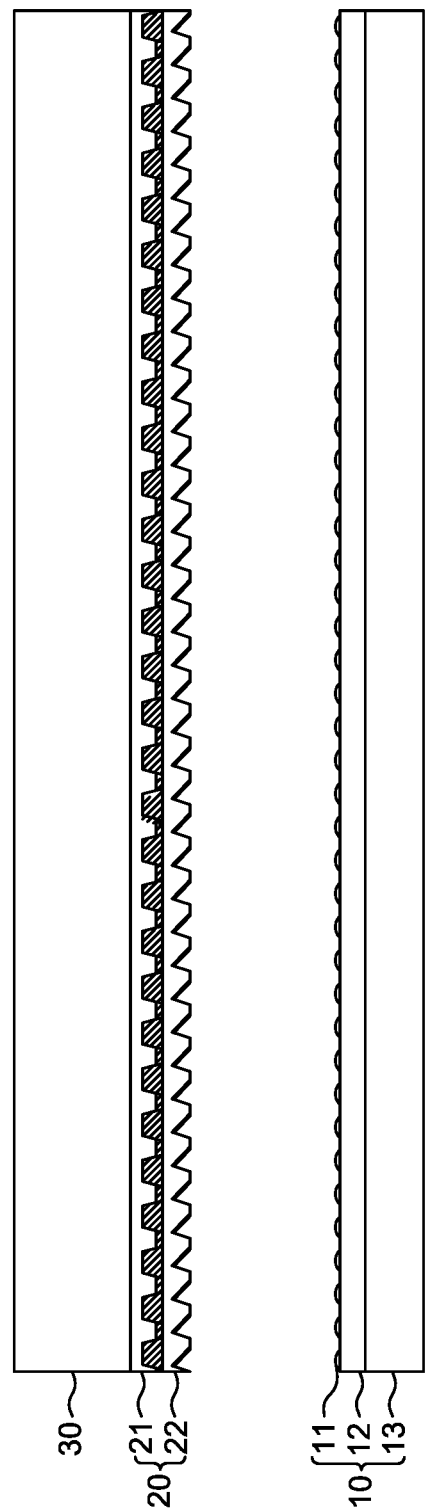
FIG. 4 is a sectional view illustrating the display capable of detecting fingerprint taken along line I-I' in FIG. 1.

FIG. 4 is a sectional view illustrating the display capable of detecting fingerprint taken along line I-I' in FIG. 1.

Referring to FIG. 4, the image sensor layer 10 includes micro lens 11, an optical path extending layer 12, and an image sensor 13, and a display 20 includes the display panel 21 having the prism surface 22. The glass cover 30 is coupled to the top surface of the display panel 21.

The bottom surface of the display panel 21 is the prism surface 22 on which prism valleys and prism peaks are alternately formed. The top surface of display panel 21 is coupled to the glass cover 30 so light that the display panel 21 generates can pass through the glass cover 30 to go outside. The prism valleys and the prism peaks on the prism surface 22 are formed by the first inclined face 221 and the second inclined face 222. The prism valleys face the glass cover 30 and the prism peaks face the micro lens. Inclination angles of the first inclined face 221 and the second inclined face may be substantially identical or different.

The image sensor layer 10 includes the image sensor 13, the optical path extending layer 12 arranged above the image sensor 13, and a plurality of micro lenses 11 formed on the optical path extending layer 12. The plurality of micro lenses 11 refracts secondly rays of light that the prism surface 22 refracts firstly to propagate toward the light receiving portion 131 in the image sensor 13.

The light selection structure includes the prism surface 22 of the display panel 21 and the plurality of micro lenses 11 formed above the image sensor layer 10. By the light selection structure, the ray of light having the target incidence angle can arrive at the light receiving portion of the image sensor 13, but rays of light having incidence angle other than the target incidence angle cannot arrive at the light receiving portion. Since an area through which ray of light cannot pass is relatively larger than an area through which ray of light can pass in the display panel 21, the prism surface 22 and the plurality of micro lenses 11 should be located on the area through which ray of light can pass. That is, if the prism surface 22 fails to correspond to the area through which ray of light can pass, ray of light cannot be incident on the image sensor 13. Thus, the light selection structure should be formed on the area through which ray of light can pass.

In one embodiment, the prism surface 22 may be formed by attaching a prism sheet on the bottom surface of the display panel in a process of manufacturing display panel. By arranging the plurality of micro lenses inside of the prism valleys after attaching the prism sheet on the bottom surface of the display panel 21, the light selection structure can be completed. This fabrication method is more advantageous than a method of attaching a top surface of prism sheet that is already coupled to the micro lenses to the bottom surface of the display panel 21. If the prism sheet is coupled in the fabrication method of display panel, it is very easy to align the prism valleys and/or the prism peaks along the area through which light can pass. In another embodiment, the prism surface 22 can be formed on the bottom surface of the display panel 21. The prism surface includes the prism peaks and the prism valleys that are alternately arranged. The prism peaks and the prism valleys can be formed by etching a bottom surface of substrate on which the prism peaks and the prism valleys are not formed. The prism surface 22 may be formed at least a portion of or a whole of bottom surface of the display panel 21. Especially, if the prism surface 22 is formed on the whole of the bottom surface of the display panel 21, the image sensor layer 10 can be coupled to the prism surface 22 at any location.

It is advantageous that the display panel 21 having the prism surface 22 can reduce a cost of implementing a function of detecting fingerprint in the display. The related arts to implement a fingerprint recognition function should change a pixel structure of the display panel. On the other hand, there is no need to change the pixel structure when using a packaged fingerprint recognition device, but a precise arrangement is required to fix it to the display panel, and if it is not arranged correctly, it may not function properly. In addition, due to the cost of packaging, a cost of manufacturing display panel will increase.

Figure 5:
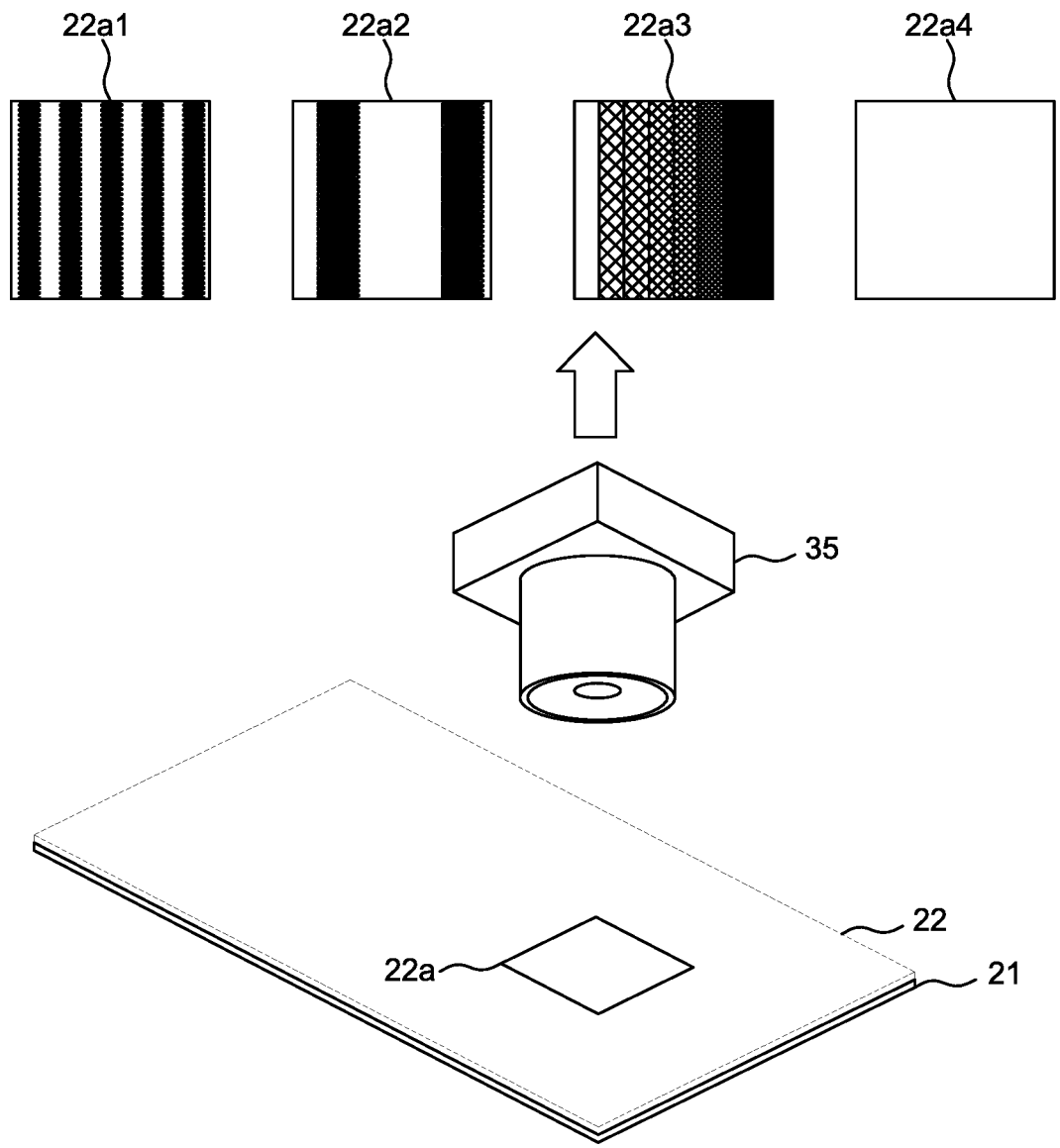
FIG. 5 illustrates a method of arranging the image sensor layer and the display panel in the process of fabricating display shown in FIG. 4.

FIG. 5 illustrates a method of arranging the image sensor layer and the display panel in the process of fabricating display shown in FIG. 4.

The display panel 21 and the prism surface 22 should be arranged in order for the target ray of light to be incident on the image sensor 13. The prism surface 22 of the prism sheet includes prism peaks/valleys arranged in one direction, and the display panel 21 has complex structures such as wirings that may be parallel with or perpendicular to the prism peaks/valleys and may affect a propagation of light. Thus, the image sensor 13 can generate a clear fingerprint image only when the display panel 21 and the prism surface are aligned properly.

For example, the prism sheet having the prism surface may be coupled to the bottom surface of the display panel 21 by use of optically transparent adhesives such as a transparent epoxy. When flashing a light, for example, toward the top surface of the display panel 21 before hardening the adhesive, light comes out of the prism surface 22 that passes through the display panel 21 and the prism sheet. Light from the prism surface 22 has different Moiré patterns according to a state of alignment between the display panel 21 and the prism surface 22.

The state of alignment between the display panel 21 and the prism surface 22 can be determined based on the Moiré pattern that is formed on the prism surface 22 that is optically coupled to the display panel 21. An alignment image can be obtained by having a camera 35 that is coupled to a process equipment (not shown) take a picture of a whole of or a portion 22a of prism surface 22. The process equipment may keep rotating or vertically/horizontally moving the prism sheet according to the Moiré pattern appearing on the alignment image until the Moiré pattern disappears or meets a predetermined condition (e.g., minimum values of pattern displacement and/or pattern width) on the alignment image. An arrangement image 22a1 obtained when a proper alignment is not accomplished has the Moiré pattern having the shortest pattern displacement and the narrowest pattern width. In this state, the process equipment may rotate in a clockwise/counterclockwise direction or move the prism sheet vertically/horizontally. In alignment images 22a2, 22a3 taken during rotation/movement of the display panel 21 and the prism surface 22 or after being properly aligned, the pattern displacement and the pattern width can increase. An alignment image 22a4 shows that the Moiré pattern can disappear in state of ideal alignment.

Figure 6:
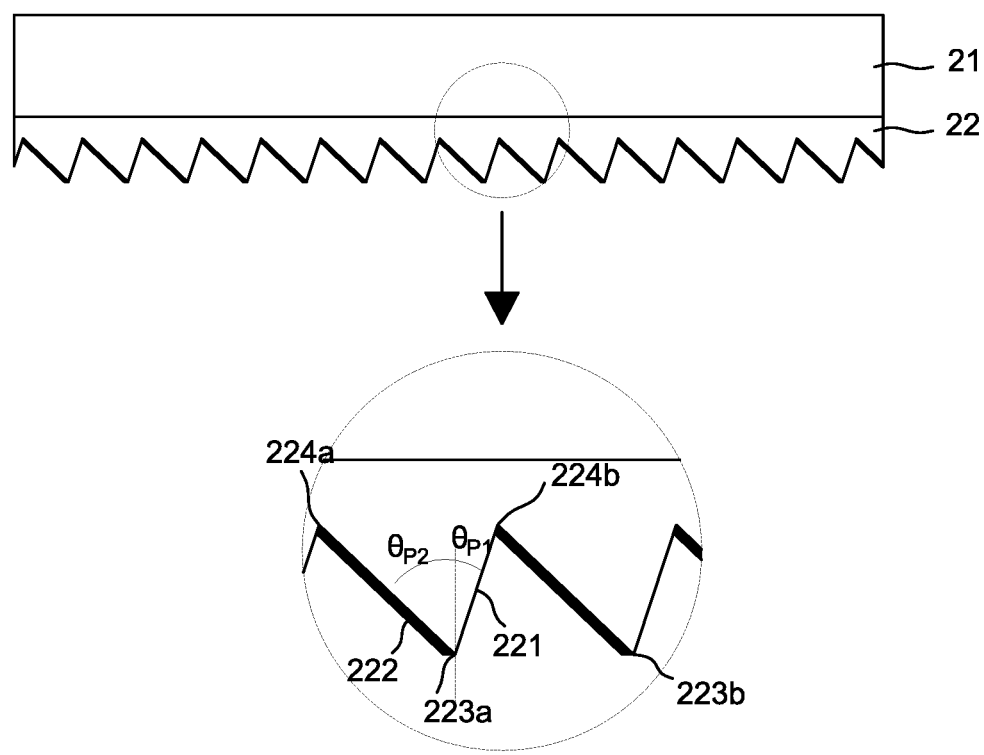
FIG. 6 illustrates a cross-sectional view of display panel according to one embodiment.
Figure 7:
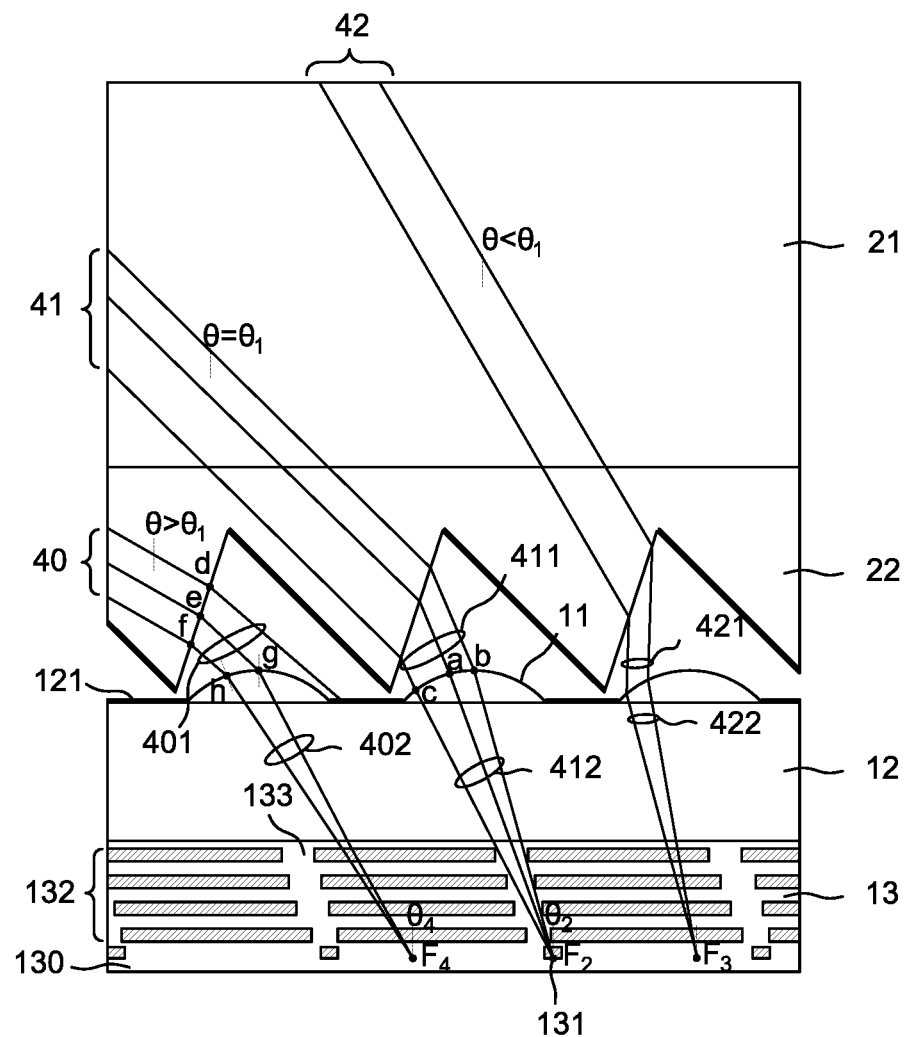
FIG. 7 illustrates a cross-sectional view of image sensor layer coupled to the display panel.

FIG. 6 illustrates a cross-sectional view of display panel according to one embodiment, and FIG. 7 illustrates a cross-sectional view of image sensor layer coupled to the display panel.

Referring to FIGS. 6 and 7, the image sensor layer 10 includes the plurality of micro lenses 11, the optical path extending layer 12, and the image sensor 13. The light selection structure includes the prism surface 22 that is coupled to or formed on the display and the plurality of micro lenses 11. The prism surface 22 and the plurality of micro lenses 11 select the target ray of light out of rays of light which are incident on the image sensor layer 10 at various incidence angles through the glass cover 30 and the display panel 21.

In FIG. 6, the prism surface 22 includes the first inclined faces 221 and the second inclined faces 222. The first inclined faces 221 and the second inclined faces 222 that are alternately arranged alternately form the prism peak and a prism valley. The prism peaks face the plurality of micro lenses 11 and the prism valleys face the display.

The first inclined faces 221 of the prism surface 22 refract rays of light 40, 41, and 42 that propagate from the upper-left side to the lower-right side, and the second inclined faces 222 refract rays of light that propagate from the upper-right side to the lower-left side. For this purpose, the first inclined face 221 is formed obliquely between a prism peak 223a and a prism valley 224b, and the second inclined face 222 is formed obliquely between the prism peak 223a and a prism valley 224a. In FIG. 6, an inclination angle of the first inclined face 221 is $\theta_{P1}$, and an inclination angle of the second inclined face 222 is $\theta_{P2}$. In the embodiment shown in FIG. 6, $\theta_{P1}$ and $\theta_{P2}$ are different from each other, but $\theta_{P1}$ and $\theta_{P2}$ may be substantially the same as each other as well. In FIG. 6, it is assumed that $\theta_{P1}$ ranges from about 15 degrees to about 20 degrees and $\theta_{P2}$ ranges from about 30 degrees to about 50 degrees. As $\theta_{P2}$ increases, the light intensity of the target ray of light incident on the light receiving portion 131 can increase. An interior angle of the prism peaks and the prism valleys which are formed by the first inclined faces 221 and the second inclined faces 222 is $\theta_{P1}+\theta_{P2}$ and the target incidence angle at which rays of light are incident on the light receiving portion 131 can be determined depending on the interior angle $\theta_{P1}+\theta_{P2}$ or a prism pitch (that is, an interval between the prism peak 223a and the prism peak 223b or an interval between the prism valley 224a and the prism valley 224b).

The second inclined face 222 can block rays of light which propagate from the upper-right side to lower-left side. For this purpose, a light absorbing layer including a light absorbing material can be formed on the surface of the second inclined faces 222. The light absorbing layer formed on the surface of the second inclined faces 222 absorbs rays of light that propagate from the upper-right side to the lower-left side. As a result, rays of light having an incidence angle other than the target incidence angle do not arrive at the light receiving portions 131.

In FIG. 7, the plurality of micro lenses 11 refract rays of light passing through the prism surface 22 to propagate toward a lower part of the image sensor layer 10, that is, the image sensor 13. In order to enhance incidence angle selectivity by the plurality of micro lenses 11, the optical path extending layer 12 may be interposed between the plurality of micro lenses 11 and the image sensor 13. The thickness of the optical path extending layer 12 may be, for example, about five times of the central thickness of the micro lens 11, which is merely an example and can increase or decrease depending on various factors such as a spherical aberration of the micro lens 11 and the target incidence angle. The refractive indexes of the plurality of micro lenses 11 and the optical path extending layer 12 can be substantially the same as each other. In one embodiment, a light absorbing layer 121 including a light absorbing material can be formed in some areas in which the plurality of micro lenses 11 are not formed on the top surface of the optical path extending layer 12. The light absorbing layer 121 prevents rays of light having an incidence angle other than the target incidence angle from passing through the optical path extending layer 12 and being incident on the image sensor 13.

Instead of the conventional purpose of increasing the light intensity of rays of light incident on the light receiving portions 131, the plurality of micro lenses 11 are used for the purpose of causing only rays of light having a specific angle to be incident on the light receiving portions 131 in the image sensor layer 10. The plurality of micro lenses 11 are located below the prism surface 22 and spaced from the prism surface 22. Accordingly, a material having refractive index different from those of the prism surface 22 or the plurality of micro lenses such as air is interposed between the prism surface 22 and the plurality of micro lenses 11. By using a difference in refractive index between the prism sheet and the air and a difference in refractive index between the air and the micro lens, the target ray of light out of rays of light propagating from the top surface of the glass cover 200 can pass through a properly-designed optical path and rays of light having incidence angles other than the target incidence angle can be deviated from the optical path.

The image sensor 13 includes the light receiving portions 131 formed on a substrate 130 and the metal layer 132 that is formed above or below the light receiving portions 131. The light receiving portions 131 serve to detect incident rays of light and to generate a pixel current. The pixel current may be conveyed to outside through the metal layer 132.

In order to improve incidence angle selectivity, the center of light receiving portion 131 and the center of the corresponding micro lens 11 may not coincide with each other. In FIG. 7, the light receiving portion 131 is located at a right side of the center of the corresponding micro lens 11. Here, the light receiving portion 131 is located at a position which can be reached by the target ray of light refracted by the corresponding micro lens 11, and can be decided by various factors such as the target incidence angle, the refractive index of the micro lens 11, and a height of the optical path extending layer 12 and so on. By this arrangement, the incidence angle selectivity of the image sensor layer 10 can be improved.

On the other hand, in order to improve the incidence angle selectivity, the width of each light receiving portion 131 is set to be smaller than the diameter of each micro lens 11. When the width of the light receiving portion 131 is relatively large, rays of light having an angle other than the target incidence angle can also be detected. Accordingly, when the light receiving portion 131 is formed at a point which can be reached by the target ray of light refracted by the light selection structure, rays of light having the incidence angle other than the target incidence angle reach the bottom surface of the substrate 130 on which no light receiving portion 131 is formed.

The metal layer 132 for the optical path and electrical wiring can be formed above the light receiving portion 131 (Back surface Illumination; BSI). On the other hand, the metal layer 132 formed below the light receiving portion 131 can serve as electrical wiring only (Front Surface Illumination; FSI). A plurality of metal lines constituting the metal layer 132 form electrical wiring for transmitting a control signal to the light receiving portions 131 or drawing a pixel current generated by the light receiving portions 131 to the outside. The plurality of metal lines can be electrically isolated from each other by an inter-metal dielectric (IMD) or the like. The optical paths 133 defined by the plurality of metal lines can be formed by the IMD. For example, since a ray of light selected by the micro lens 11 is incident obliquely on the surface of the light receiving portion 131, the optical path can also be formed obliquely. On the other hand, each optical path 133 can be formed to have a sectional area which is relatively narrower than that of an optical path of a general CMOS image sensor (CIS). For example, the optical paths 133 defined by the plurality of metal lines may be formed to be perpendicular to the top surface of the light receiving portions 131. Such an optical path having a relatively small sectional area is disclosed in Korean Patent Application Laid-Open No. 10-2016-0048646, which is incorporated herein by reference.

The principle of selecting a target ray of light depending on an incidence angle on the image sensor layer 10 will be described below.

FIG. 7 illustrates rays of light 40, 41, and 42 which arrive at different points in the horizontal direction depending on an incidence angle θ on the image sensor layer 10. In the following description, an incidence angle refers to an angle between a propagating direction of a ray of light when the ray of light is incident on the prism surface 22 of the display panel 21 and a virtual line perpendicular to the top surface of the display panel 21.

The ray of light 40 having an incidence angle θ larger than the target incidence angle $\theta_1$ is refracted in the clockwise direction by the first inclined face 221 of the prism surface 22 and the micro lens 11. Here, the target incidence angle $\theta_1$ is substantially the same as the glass cover incidence angle when propagating from the glass cover 30. The ratio that the ray of light 40 having an incidence angle θ larger than the target incidence angle $\theta_1$ is refracted by the first inclined face 221 to be incident on the micro lens 11 is relatively lower than that of other rays of light 41, 42. The ray of light 40 can be incident on the first inclined face 221 at between Point f and the prism valley 224b of the prism surface, and it is because that the ray of light 40 propagating toward the first inclined face 221 at between Point f and the prism peak 223a will be blocked by the valley 224a of the prism surface 22 at the left side of the first inclined face 221. The ray of light incident on the first inclined face 221 at between Point d and the prism valley 224b of the prism surface is refracted to propagate toward an area between adjacent micro lenses 11. If the light absorbing layer 121 is formed on that area, the refracted ray of light will be blocked by the light absorbing layer 121. The ray of light incident on between Point e and Point d is refracted to propagate toward the micro lens 11, but since the incidence angle increases sharply at Point g, so the refracted ray of light 401 propagating toward the right side of Point g on the micro lens 11 will be reflected. Thus, the ray of light 40 incident on the first inclined face 221 at between Point f and Point e will be refracted by the micro lens to propagate toward the image sensor 13. The ray of light 402 that is incident on the first inclined face 221 at between Point f and Point e and refracted by the micro lens 11 can propagate toward Point $F_4$, but will be blocked by the metal layer 132.

The ray of light 41 having the target incidence angle $\theta_1$ is refracted in the clockwise direction at the first inclined face 221 toward the micro lens 11. Here, since the refractive index of the prism surface 22 is relatively larger than that of air, a refraction angle is relatively larger than the incidence angle at the first inclined face 221.

The ray of light 411 refracted by the first inclined face 221 is refracted to propagate toward the light receiving portion 131 by the micro lens 11. The spherical aberration of the micro lens 11 is determined such that the ray of light 41 having the target incidence angle $\theta_1$ that is refracted by the first inclined face 221 propagates toward the light receiving portion 131 when incident on the micro lens 11. The incidence angle of the refracted ray of light 411 on the micro lens 11 may be substantially equal to or less than 20 degrees. Since the normal line at Point a of the micro lens 11 is substantially the same as the incidence angle of the refracted ray of light 411, the ray of light 411 propagates to the light receiving portion 131 without being refracted. An angle between the normal line and the ray of light 411 increases to the left side of the normal line, that is, in the counterclockwise direction from Point a to Point c, and also an angle between the normal line and the ray of light 411 increases to the right side of the normal line, that is, in the clockwise direction. Accordingly, the ray of light 411 is refracted in the clockwise direction at Point b and propagates toward the light receiving portion 131. The ray of light 411 is refracted in the counterclockwise direction at Point c and propagates toward the light receiving portion 131. Since the incidence angle of the ray of light 411 incident on the right side of Point b increases sharply, the ray of light 411 incident on the right side of Point b will be substantially reflected. Here, since the ray of light 411 is incident on the micro lens 11 through the air and the refractive index of the air is less than the refractive index of the micro lens, the refraction angle by the micro lens 11 is smaller than the incidence angle on the micro lens 11.

The ray of light 42 having an incidence angle θ which is smaller than the target incidence angle $\theta_1$ is refracted to propagate toward the micro lens 11 by the first inclined face 221. When the incidence angle θ of the ray of light 42 decreases, the incidence angle on the first inclined face 221 increases. If the incidence angle on the first inclined face 221 becomes larger than a total reflection angle, the ray of light 42 will be full-reflected by the first inclined face. As the incidence angle of the ray of light 42 decreases, the refracted ray of light 421 by the first inclined face 221 will propagate toward the left-side of the micro lens 11. The ray of light 421 incident on the left-side of the micro lens 11 will be refracted by the micro lens 11 to propagate toward the image sensor 13. The refracted ray of light 422 by the micro lens 11 will propagate toward Point $F_3$ but will be blocked by the metal layer 132.

Figure 8:
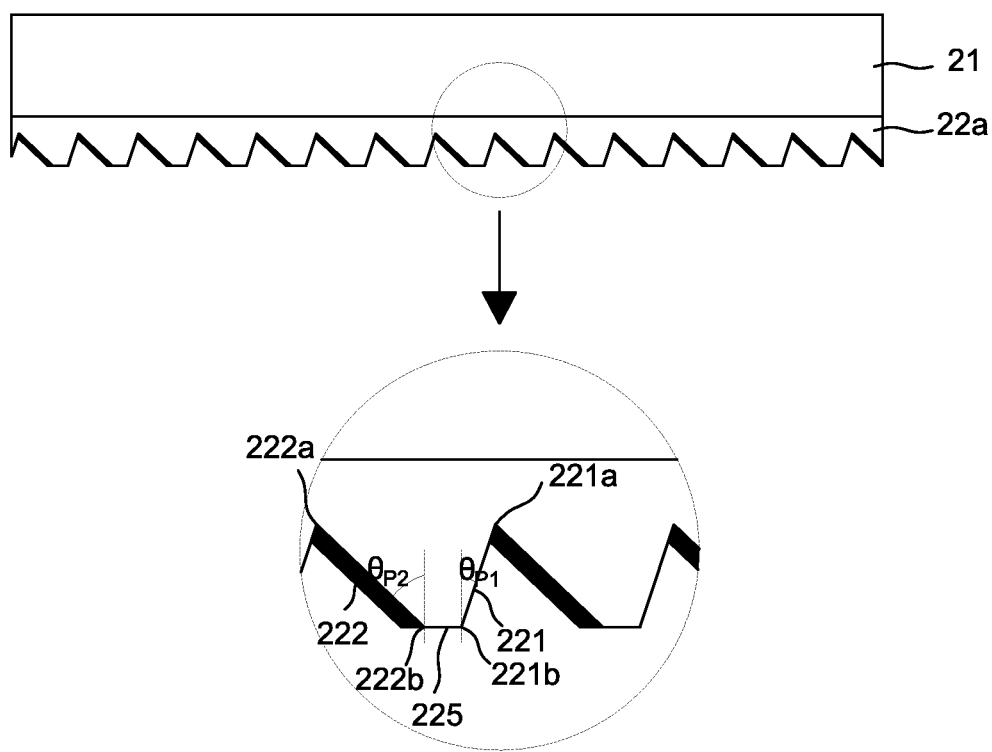
FIG. 8 illustrates a cross-sectional view of display panel according to another embodiment.
Figure 9:
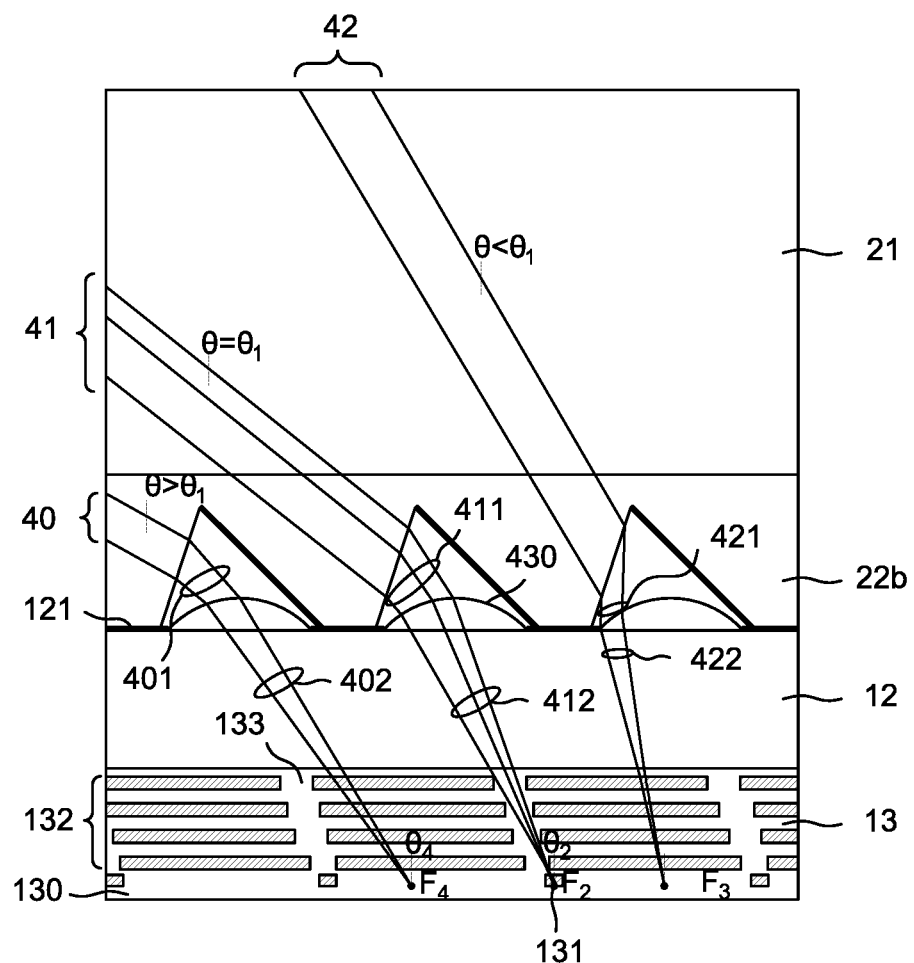
FIG. 9 illustrates a cross-sectional view of image sensor layer coupled to the display panel.

FIG. 8 illustrates a cross-sectional view of display panel according to another embodiment, and FIG. 9 illustrates a cross-sectional view of image sensor layer coupled to the display panel. The elements which are substantially identical or similar to those illustrated in FIGS. 6 and 7 will not be described and differences from those illustrated in FIGS. 6 and 7 will be mainly described below.

Referring to FIGS. 8 and 9, the image sensor layer 10 includes the plurality of micro lenses 11, the optical path extending layer 12, and the image sensor 13. The light selection structure includes the prism surface 22a of the display panel 21 and the plurality of micro lenses 11. The prism surface 22a and the plurality of micro lenses 11 select the target ray of light out of rays of light that propagate toward the image sensor layer 10 at various incidence angles through the glass cover 30 and the display panel 21.

In FIG. 8, the prism surface 22a has a self-aligning and self-supporting structure. Compared with the prism surface 22 illustrated in FIG. 6, the prism surface 22a has a structure in which a tip of a prism peak is removed. Specifically, a top end 221a of the first inclined face 221 is coupled to a top end 222a of a second inclined face 222 to form a prism valley, both ends of a bottom surface 225 extending laterally in substantially parallel to a top surface of the display panel 21 are connected respectively to a bottom end 221b of the first inclined face 221 and a bottom end 222b of the second inclined face 222. The width of the bottom surface 225 may be substantially equal to or smaller than a distance between the micro lenses 11. Accordingly, the prism surface 22a and the plurality of micro lenses 11 can be aligned by only arranging the bottom surface 225 of the prism surface 22a between the micro lenses 11. Since the prism surface 22a can be supported by the bottom surface 225 which is substantially horizontal, a particular structure for supporting or attaching the prism surface 22a is not necessary.

Figure 11:
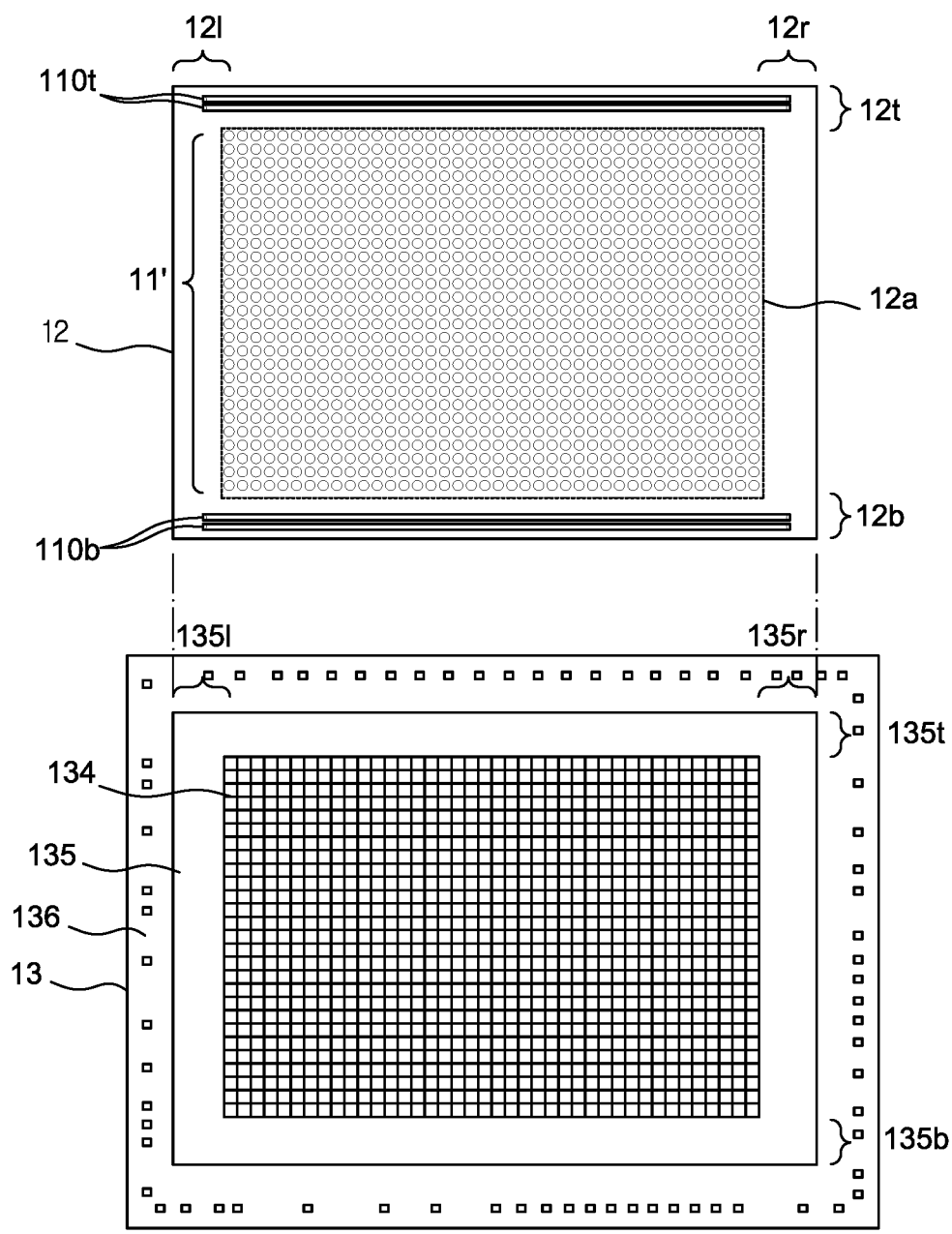
FIG. 11 illustrates an active area and a marginal area on the semiconductor chip shown in FIG. 10.

FIG. 10 illustrates a semiconductor chip having an alignment bar for coupling to a top structure, and FIG. 11 illustrates an active area and a marginal area on the semiconductor chip. Here, the top structure is, for example, a display 20 having a prism surface 22 formed thereon or a display 20 including a prism sheet and a display panel 21, and the semiconductor chip is, for example, an image sensor 13 or a fingerprint image sensor 10', but not limited to these sensors.

Referring to FIGS. 10 and 11, the fingerprint image sensor 10' to be coupled to the prism surface 22 includes alignment bars 110t, 110b formed thereon. The alignment bars 110t, 110b may be formed on the image sensor 13 or an optical path extending layer 12. The alignment bars 110t, 110b may be formed simultaneously when the micro lens array 11' is formed. The optical path extending layer 12 may be a planarization layer formed directly on the top surface of the image sensor 13 for the purpose of planarizing the top surface of the image sensor, or an optically transparent substrate that is manufactured separately and then coupled to the top surface of the image sensor 13. Hereinafter, CIS (CMOS Image Sensor) will be referred as an example of the image sensor 13, but not limited to CIS.

The image sensor 13 may include the active area 134, the marginal area 135, and a pad area 136. In the active area 134, a plurality of pixels having the light receiving portion are arranged. The marginal area is located on the periphery of the active area 134. In the marginal area 135, a driver/processor configured for driving pixels in the active are 134 or processing pixel currents from the pixels, or no pixels are located thereon. The marginal area may be separated into more than two sub-marginal area, and FIG. 10 illustrates four sub-marginal areas 135l, 135r, 135t, 135b. Here, two sub-marginal areas that are perpendicular to each other may be overlapped. In CIS, the active area may have the pixel array arranged thereon, and the marginal area 135 having no pixels may surround the pixel array. The pad area 136 is for arranging a plurality of metal pad configured for electrical connection. Depending on the type of image sensor 13, the marginal area 135 may be very small or may not exist.

In one embodiment, in case that the optical path extending layer 12 is manufactured separately and then coupled to the image sensor 13, the optical path extending layer 12 includes the first area 12a corresponding to the active area 134 and more than one of the second area 12l, 12r, 12t, 12b corresponding to the marginal area 135. The micro lens array 11' consisting of the plurality of micro lenses 11 is formed on the first area 12a, and the alignment bar 110t is formed on the second area 12t among the plurality of the second areas 12l, 12r, 12t, 12b. The micro lens 11 has a circular shape from top view, and includes a convex surface that is not in contact with the top surface of the optical path extending layer 12 and a flat surface that is in contact with the top surface of the optical path extending layer 12. On the other hand, the micro lens 11 may have a semi-cylindrical shape.

More than two of alignment bars 110t may be formed on the second area 12t. In addition, more than two of alignment bars 110b may be formed on the second area 12b. Although not shown, a single alignment bar may consist of at least two of bar segments formed on a same line. The number of alignment bar 110t and/or 110b may increase or decrease depending on the width of area on which the bar is formed and/or a lens pitch of the micro lens array 11'.

The first area 12a of the optical path extending layer 12 may or may not correspond to the active area 134 of the image sensor 13. Specifically, the first area 12a may be located directly above the active area 134, and may have the same dimension and shape. Accordingly, the first area 12a may cover the whole of the active area 134. On the other hand, the first area 12a may be located directly above a portion of the active area 134, and may have dimension and/or shape different from the active area 134. Accordingly, the first area 12a may cover a portion of the active area 134.

Similarly, the second areas 12l, 12r, 12t, 12b of the optical path extending layer 12 may or may not correspond to the marginal area 135 of the image sensor 13. For example, in case that the first area 12a covers a portion of the active area 134 or the image sensor has no marginal area 135, the second areas 12l, 12r, 12t, 12b of the optical path extending layer 12 may be located directly above a portion of the active area 134.

In another embodiment, in case that the optical path extending layer 12 is a part of image sensor (e.g., planarization layer) or does not exist, a pair of alignment bars 110t may be formed on the sub-marginal area 135t. In addition, the pair of alignment bars 110b may be further formed on the sub-marginal area 135b of the image sensor 13.

FIGS. 12A and 12B illustrate a method of forming the alignment bar shown in FIG. 10 and FIGS. 13A, 13B, 13C and 13D illustrate reflow of micro lens pattern and alignment bar pattern shown in FIG. 11.

Referring to FIGS. 12A and 12B, when being coupled to the bottom surface of display panel 21 having the prism surface 22, the alignment bars 110t and 110b may be formed at the same time when the micro lens array is formed. If the alignment bars 110t, 110b and the micro lens array 11' are formed simultaneously, a height difference on the top surface of the image sensor 13 or top surface of the optical path extending layer 12 may not occur. If the alignment bars 110t, 110b and the micro lens array 11' are formed separately, heights of the top surface of the image sensor 13 or top surface of the optical path extending layer 12 may become uneven due to etching and/or hardening. This may cause the difference in the height of alignment bars 110t, 110b as well. When the heights of alignment bars 110t, 110b are changed, the fingerprint image sensor 10' may become inclined when being coupled to the bottom surface of the display panel so this should be adjusted. On the contrary, if the alignment bars 110t, 110b and the micro lens array 11' are formed during same patterning-reflowing-hardening process, a variation in flatness over the top surface of the image sensor 13 or the top surface of the optical path extending layer 12 can be minimized.

Referring to FIGS. 13A and 13B, a micro lens pattern 11" and alignment bar pattern 110t' are formed on the top surface of the image sensor 13 or the optical path extending layer 12 in same patterning process. The micro lens pattern 11" is formed on the active area 134 or on the first area 12a, and the alignment bar pattern 110t' is formed on the sub-marginal area 135t or the second area 12t. The material used to form the micro lens pattern 11" and the alignment bar pattern 110t' may be the same and may be optically transparent.

The micro lens pattern 11" is formed to be cylindrical and the alignment bar pattern 110t' is formed to be rectangular parallelepiped. Since these are formed during the same patterning process, the thickness of the micro lens pattern 11" and the alignment bar pattern 110t' may be identical. On the other hand, a diameter of the micro lens pattern 11" and a width of the alignment bar pattern 110t' may be substantially identical.

Referring to FIGS. 13C and 13D, the micro lens 11 and the alignment bar 110t may be formed by reflowing the micro lens pattern 11" and the alignment bar pattern 110t'. When applying heat to the micro lens pattern 11" and the alignment bar pattern 110t' in solid state, the micro lens pattern 11" and the alignment bar pattern 110t' are melted to be liquefied. Although being liquefied, the shape of bottom of patterns 11" and 110t' are maintained but liquefied top portion forms a curved surface due to a surface tension.

Assuming that volume of cylindrical micro lens pattern 11" and volume of micro lens 11 are substantially identical, the micro lens 11 may be higher than the micro lens pattern 11". The liquefied micro lens pattern 11" will have a spherical shape due to the surface tension. Although it will vary depending on a diameter and thickness of micro lens pattern 11", since a center of sphere is located below an interface between the pattern and the top surface, the center of liquefied micro lens pattern 11" rises up above the periphery of the center. Namely, due to the surface tension acting radially on the surface of the liquefied micro lens pattern 11", the convex surface can be formed.

Similarly, assuming that volume of the rectangular parallelepiped alignment bar pattern 110t' and volume of the alignment bar 110t are substantially identical, the alignment bar 110t may be higher than the alignment bar pattern 110t'. It is assumed that the height and width of the micro lens pattern 11" and the alignment bar pattern 110t' are substantially identical. The surface tension also acts on the surface of liquefied alignment bar pattern 110t' to have it form a curved surface. Unlike the micro lens pattern 11", since the bottom surface of the alignment bar pattern 110t' is rectangular, a surface tension acting in a lateral direction perpendicular to a lengthwise direction is much larger than a surface tension acting in the lengthwise direction. Due to this, the center of the liquefied alignment bar pattern 110t' rises up above the periphery of the center, and the center of the alignment bar 110t may be higher than the center of micro lens 11.

The fingerprint image sensor 10' may be self-aligned when being coupled to the prism surface 22 of the display panel 21. The alignment bars 110t, 110b are accommodated in the prism valleys. The plurality of micro lenses 11 composing the micro lens array 11' are formed to be spaced by a certain distance. Thus, the prism peaks of the prism surface 22 are arranged at between micro lenses, and the plurality of micro lenses 11 and the alignment bars 110t, 110b are accommodated inside of the prism valleys. Accordingly, it will be possible to couple the fingerprint image sensor 10' to the prism surface 22 without additional process of alignment.

Although the method of simultaneously forming the micro lens array and the alignment bar by reflow is described, it is also possible to simultaneously form the micro lens array and the alignment bar by injection-molding with a template having engraved micro lens array and alignment bar and imprinting them onto the top surface of the fingerprint image sensor 10' or the optical path extending layer 12. Besides these methods, various methods, for example, an etching with a pulse laser, a dry etching, a glass surface processing with a laser, a deposition of polymer with a laser, may be used for simultaneously forming the micro lens array and the alignment bar.

Figure 14A:
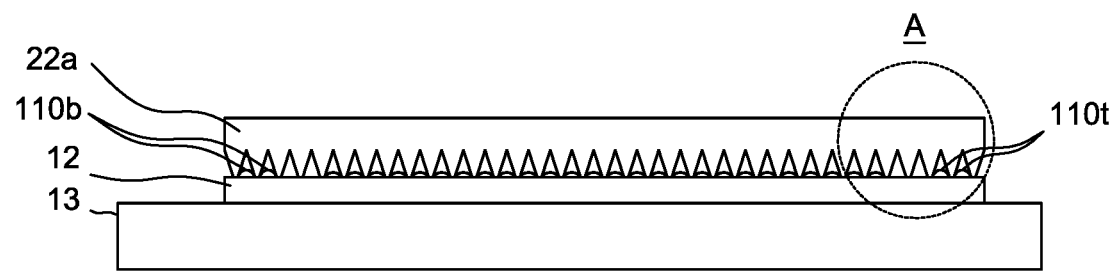
FIGS. 14A and 14B illustrate a semiconductor chip and a top structure arranged above the semiconductor chip.
Figure 14B:
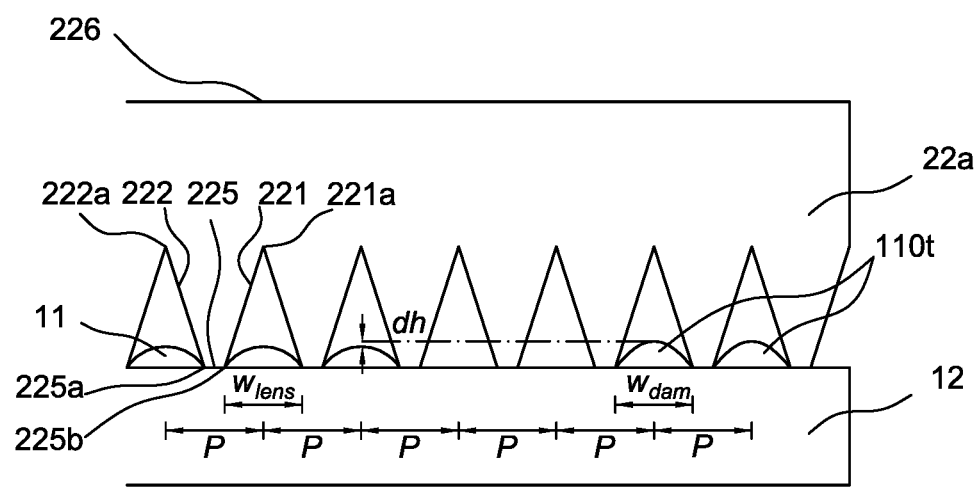

FIGS. 14A and 14B illustrate the semiconductor chip and the top structure arranged above the semiconductor chip, and in detail, FIG. 14A is a cross-sectional view showing that the top structure is arranged on the micro lens array and FIG. 14B is an enlarged view of A. The top structure is, for example, the display panel 21 having the prism surface 22 formed thereon, the display panel 21 having the prism sheet 22' (see FIG. 19) coupled thereon, or a cover 350 (see FIG. 19), and the semiconductor chip is, for example, the image sensor 13 or the fingerprint image sensor 10', but not limited.

Referring to FIGS. 14A and 14B, the prism surface 22 may be one of two surfaces of the prism sheet. The prism surface 22 includes the first inclined face 221 and the second inclined face 222. The first inclined face 221 and the second inclined face 222 that are alternately arranged form alternately the prism peaks and the prism valleys. The prism peaks face the micro lenses 11 and the prism valleys face the top surface 226 of the prism surface 22.

The prism surface 22 is a self-support structure. The top end 221a of the first inclined face 221 is coupled to a top end 222a of a second inclined face 222 to form the prism valley, both ends of a bottom surface 225 extending laterally in substantially parallel to a top surface of the display panel 21 are connected to a bottom end 221b of the first inclined face 221 and a bottom end 222b of the second inclined face 222. The width of the bottom surface 225 may be substantially equal to or less than a distance between the two adjacent micro lenses 11. Since the prism surface 22 can be supported by the bottom surface 225 which is substantially horizontal, a particular structure for supporting the prism surface 22 is not required.

In addition, inclination angles of the first inclined face 221 and the second inclined face 222 may be substantially identical or different from each other. Inclination angle is an angle between a line perpendicular to the top surface 226 of the prism surface 22 and the first/second inclined faces 221, 222. As the inclination angle increases, the amount of light incident on the inclination surface having a large inclination angle will increase.

A parallel alignment bar 110t may be formed to be spaced from the micro lens 11 by n (n is natural number) times of lens pitch P of the micro lens array 11'. In addition, in case that more than two parallel alignment bars 110t are formed, a pitch of parallel alignment bars may be identical with the lens pitch P or n times of the lens pitch P. Here, the lens pitch P can be defined as a distance between centers of two adjacent micro lenses, and may be equal to or less than the prism pitch (distance between two adjacent prism valleys). Diameter W lens (or width) of the micro lens 11 and width $W_{dam\ structure}$ of the parallel alignment bar 110t may be identical, and may be equal to or less than the prism pitch. By placing the parallel alignment bar 110t to be spaced from the micro lens 11 by n times of lens pitch P, it will be possible to dispose the prism surface intactly on the image sensor or the optical path extending layer 12 without any deformation or additional process.

In addition, since the parallel alignment bar 110t is formed of same material of which the micro lens 11 is made, an interference between them may occur if it is formed close to the micro lens 11. Thus, no micro lens may be located at between the micro lens 11 on the outmost part of the micro lens array 11' and the parallel alignment bar 110t.

FIGS. 15A, 15B, 15C and 15D illustrate alignment bars that are formed from the alignment bar patterns.

Figure 15A:
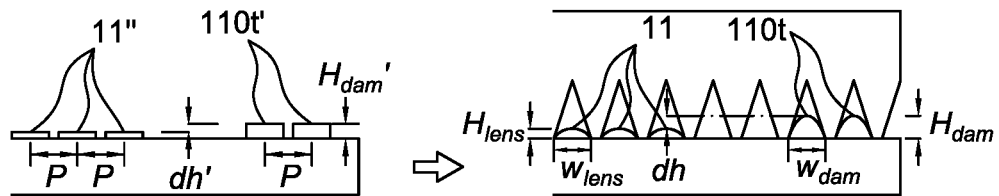
FIGS. 15A, 15B, 15C and 15D illustrate alignment bars that are formed from the alignment bar patterns.

Referring to FIG. 15A, height $H_{dam}$ of the parallel alignment bar 110t can be increased with maintaining width $W_{dam}$. For this purpose, the parallel alignment bar patterns 110t' are formed so as height $H_{dam}'$ of the parallel alignment bar pattern 110t' is higher than height of the micro lens pattern 11" by dh'. Diameter of the micro lens pattern 11" and width of the parallel alignment bar pattern 110t' may be substantially identical, and the parallel alignment bar pattern 110t' is spaced from the micro lens pattern 11" that is located on the outmost part of the micro lens array 11' by n times of lens pitch P. Pitch of parallel alignment bar patterns 110t' may be substantially identical with lens pitch P. In this case, height $H_{dam}$ of the parallel alignment bar 110t can be larger than height $H_{lens}$ of the micro lens 11 by dh. As height $H_{dam}$ of the parallel alignment bar 110t is increased, the prism surface 22a can be coupled more firmly.

Figure 15B:
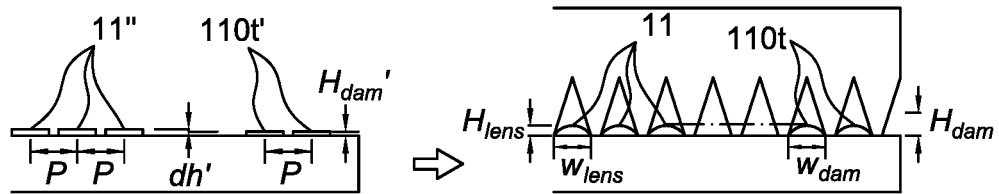

Referring to FIG. 15B, height $H_{dam}$ of the parallel alignment bar 110t can be the same as height $H_{lens}$ of the micro lens 11. For this purpose, the parallel alignment bar patterns 110t' are formed so as height $H_{dam}'$ of the parallel alignment bar pattern 110t' is smaller than height of the micro lens pattern 11" by dh'. Diameter of the micro lens pattern 11" and width of the parallel alignment bar pattern 110t' may be substantially identical, and the parallel alignment bar pattern 110t' is spaced from the micro lens pattern 11" that is located on the outmost part of the micro lens array 11' by n times of lens pitch P. Pitch of parallel alignment bar patterns 110t' is substantially identical with lens pitch P. This structure may be applied to a case that height of the prism valley and/or inclination angle is enough to accommodate the micro lens 11 but not enough to accommodate the parallel alignment bar 110t having different height.

Figure 15C:
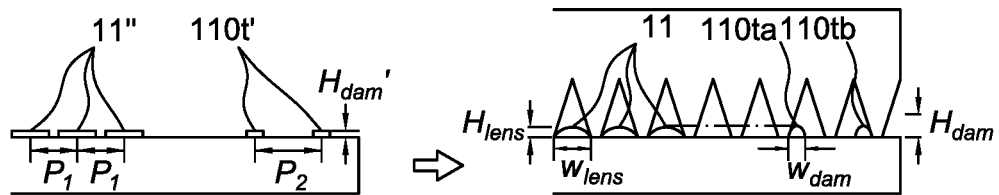

Referring to FIG. 15C, height $H_{dam}$ of the parallel alignment bar 110t can be the same as height $H_{lens}$ of the micro lens 11. For this purpose, width $W_{dam}'$ of the parallel alignment bar pattern 110t' may be formed to be narrower than width of micro lens pattern 11". Height of the micro lens pattern 11" and height of the parallel alignment bar pattern 110t' are substantially identical, and the parallel alignment bar pattern 110t' is spaced from the micro lens pattern 11" that is located on the outmost part of the micro lens array 11' by n times of lens pitch P. Pitch $P_2$ of parallel alignment bars 110t' is different from lens pitch $P_1$. Since width $W_{dam}$ of the parallel alignment bar 110t and width of the parallel alignment bar pattern 110t' are substantially identical, if pitch $P_2$ and pitch $P_1$ come to be identical, the alignment bar may lose a function to align the prism surface 22a. Thus, pitch $P_2$ may be larger than pitch $P_1$ so as the first parallel alignment bar 110ta contacts the second inclined face and the second parallel alignment bar 110tb contacts the first inclined face. On the contrary, although not shown, pitch $P_2$ may be smaller than pitch $P_1$ so as the first parallel alignment bar 110ta contacts the first inclined face and the second parallel alignment bar 110tb contacts the second inclined face.

Figure 15D:
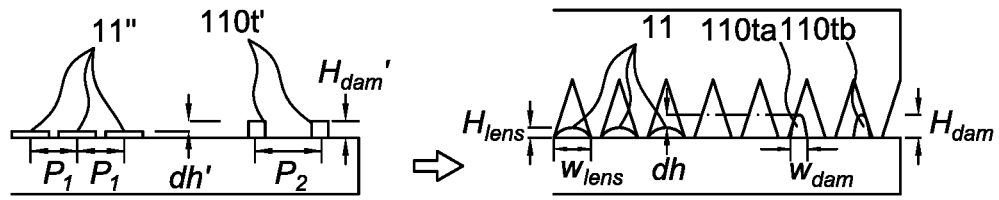

Referring to FIG. 15D, height $H_{dam}$, width $W_{dam}$ and pitch $P_2$ of the parallel alignment bar 110t may be formed to be identical with height $H_{lens}$, width $W_{lens}$ and pitch $P_1$ of the micro lens. For this purpose, width $W_{dam}'$ of the parallel alignment bar pattern 110t' may be smaller than width of the micro lens pattern 11", height $H_{dam}'$ may be larger than height of the micro lens pattern 11", and pitch $P_2$ may be different from pitch $P_1$. The parallel alignment bar pattern 110t' is spaced from the micro lens pattern 11" that is located on the outmost part of the micro lens array 11' by a certain distance. Thus, pitch $P_2$ may be larger than pitch $P_1$ so as the first parallel alignment bar 110ta contacts the second inclined face and the second parallel alignment bar 110tb contacts the first inclined face. On the contrary, although not shown, pitch $P_2$ may be smaller than pitch $P_1$ so as the first parallel alignment bar 110ta contacts the first inclined face and the second parallel alignment bar 110tb contacts the second inclined face.

Figure 16A:
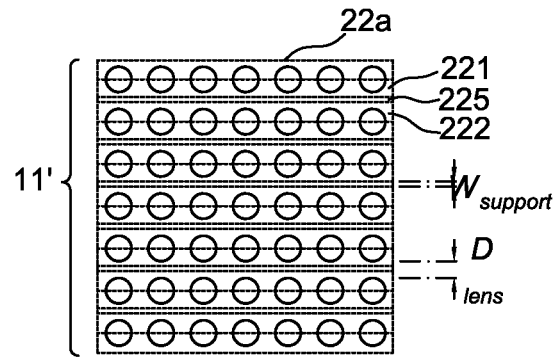
FIGS. 16A, 16B and 16C illustrate a misalignment that occurs due to gap between the micro lens.
Figure 16B:
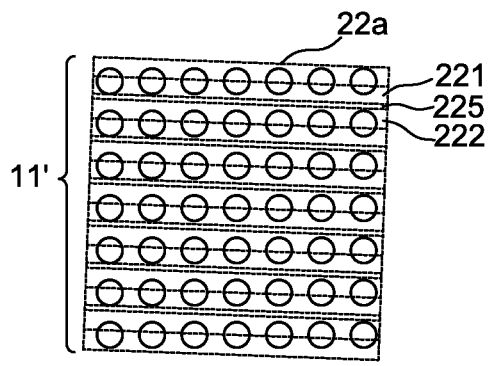
Figure 16C:
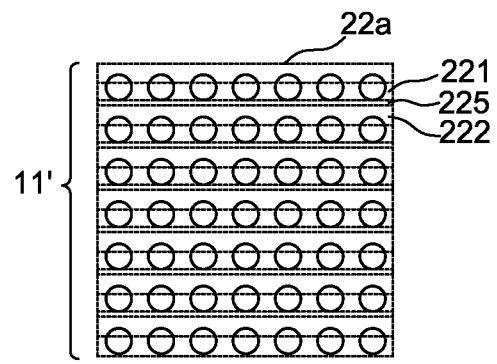
Figure 17A:
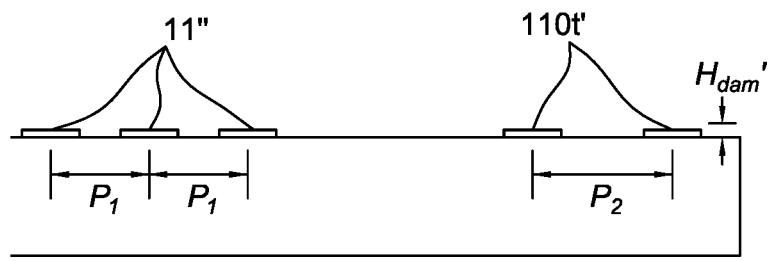
FIGS. 17A and 17B illustrate a precise alignment by use of the alignment bar.
Figure 17B:
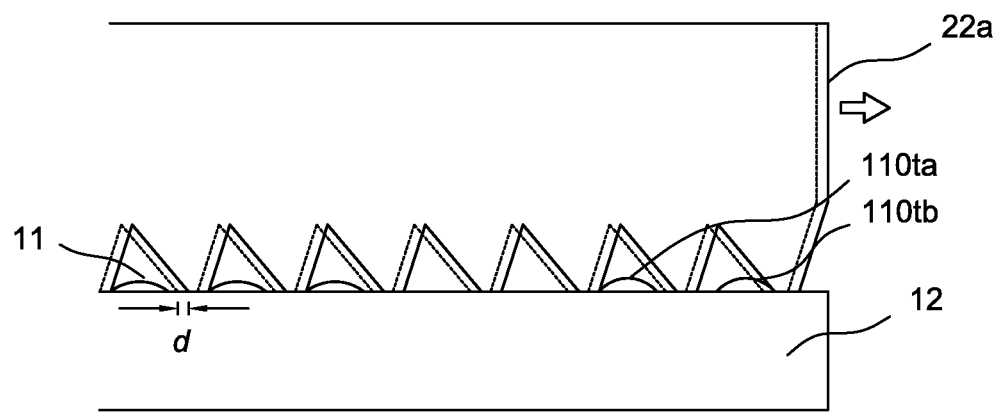

FIGS. 16A, 16B and 16C illustrate a misalignment that occurs due to gap between the micro lenses, and in detail, FIG. 16A represents the prism surface 22a aligned along a middle point between the adjacent micro lenses 11, FIG. 16B represents the prism surface 22a aligned obliquely and FIG. 16C represents the prism surface 22a aligned close to the micro lens 11. FIGS. 17A and 17B illustrate a precise alignment by use of the alignment bar, and represent cross-section of FIG. 16C.

Referring to FIGS. 16A through 17B, width $W_{support}$ of the bottom surface 225 of the prism surface 22a is smaller than a distance $D_{lens}$ between two adjacent micro lenses 11. The micro lens array 11' and the prism surface 22a that are formed or arranged above the image sensor 13 may define the optical path for rays of light to be incident on the image sensor 13. Thus the alignment should be made very precisely even though the distance $D_{lens}$ between two adjacent micro lenses 11 is several tens of micrometers. Especially more precise alignment will be required in case that the inclination angles of the first/second inclined faces 221, 222 are different from each other or the distance $D_{lens}$ between two adjacent micro lenses 11 is relatively larger than width $W_{support}$ of the bottom surface 225.

FIG. 16A represents that the bottom surface 22S of the prism surface 22a is arranged along the middle point between the micro lenses 11 by the parallel alignment bar 110t, FIG. 16C represents that the bottom surface 22S of the prism surface 22a is arranged close to the micro lens 11 by the parallel alignment bar 110t. Namely, FIGS. 16A and 16B represent the prism surface 22a that is properly aligned. Various parallel alignment bars 110t shown in FIGS. 15A through 15D may be used.

On the contrary, FIG. 16B represents the misalignment that the prism surface 22a is aligned obliquely with respect to a direction of arrangement of the micro lenses 11. The misalignment may include all instances such as the bottom surface of the prism surface arranged at a position that does not coincided with a design as well as the bottom surface aligned obliquely. The misalignment may deteriorate quality of image that is generated by the image sensor.

As shown in FIGS. 16C and 17B, the prism surface 22 may be moved by the parallel alignment bars 110ta, 110tb in a lateral direction by distance d. The lateral movement of the prism surface 22a may be required to determine the optical path between the prism surface 22a and the micro lens 11. A position at which the prism surface 22 is arranged can be adjusted by the parallel alignment bars 110ta, 110tb. For this purpose, pitch $P_2$ of the parallel alignment bars 110ta, 110tb may be larger or smaller than lens pitch $P_1$. Namely, pitch $P_2$ may be larger than lens pitch $P_1$ so as the first parallel alignment bar 110ta contacts the second inclined face and the second alignment bar 110tb contacts the first inclined face. On the contrary, although not shown, pitch $P_2$ may be smaller than lens pitch $P_1$ so as the first parallel alignment bar 110ta contacts the first inclined face and the second alignment bar 110tb contacts the second inclined face. In addition, a distance between the micro lens being located on the outmost part of the micro lens array 11 and the parallel alignment bar 110ta that is located more closer to the micro lens array 11 than the parallel alignment bar 110tb may not be n times of lens pitch $P_1$. Namely, the parallel alignment bars 110ta, 110tb may be formed at a location spaced from the micro lens array 11 by distance d in the lateral direction.

Figure 18:
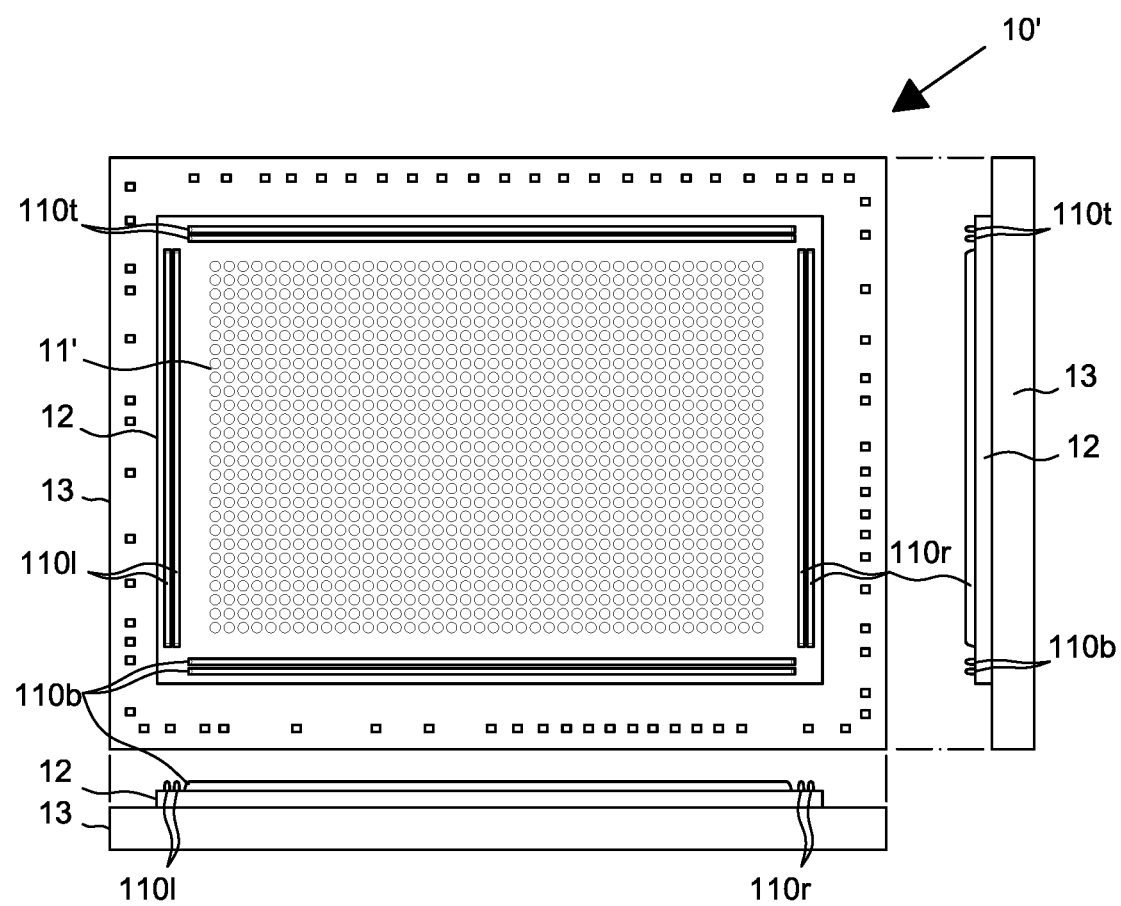
FIG. 18 illustrates the semiconductor chip having vertical alignment bars for alignment of the top structure.

FIG. 18 illustrates the semiconductor chip having vertical alignment bars for alignment of the top structure.

Referring to FIG. 18, the fingerprint image sensor 10' to be coupled to the prism surface 22a includes the vertical alignment bar 110l. The vertical alignment bar 110l may be formed as a substitute of the parallel alignment bar 110t, or may be formed together with the parallel alignment bar 110t. The vertical alignment bar 110l and the micro lens array 11' can be formed simultaneously on the image sensor 13 or the optical path extending layer 12. In one embodiment, the vertical alignment bar 110l can be used to rotate an extending direction of the prism valley (or the prism peak) of the prism surface 22 by 90 degrees or 270 degrees for alignment. In another embodiment, the vertical alignment bar 110l may be formed simultaneously with the parallel alignment bar 110t and may be used to adjust the position at which the prism surface 22 is arranged. A parallel groove for accommodating the parallel alignment bar 110t and a vertical groove for accommodating the vertical alignment bar 110l may be formed on the bottom surface of the prism surface 22.

Like the parallel alignment bar 110t, the vertical alignment bar 110l may be formed on the marginal area 135l of the image sensor 13 or on the second area 12l of the optical path extending layer 12, and more than two of vertical alignment bars 110l may be formed on the marginal area 135l or the second area 12l. In addition, an additional vertical alignment bar 110r may be further formed on the marginal area 135r that faces the marginal area 135l or on the second area 12r with the active area 134 or the first area 12a between them.

Figure 19:
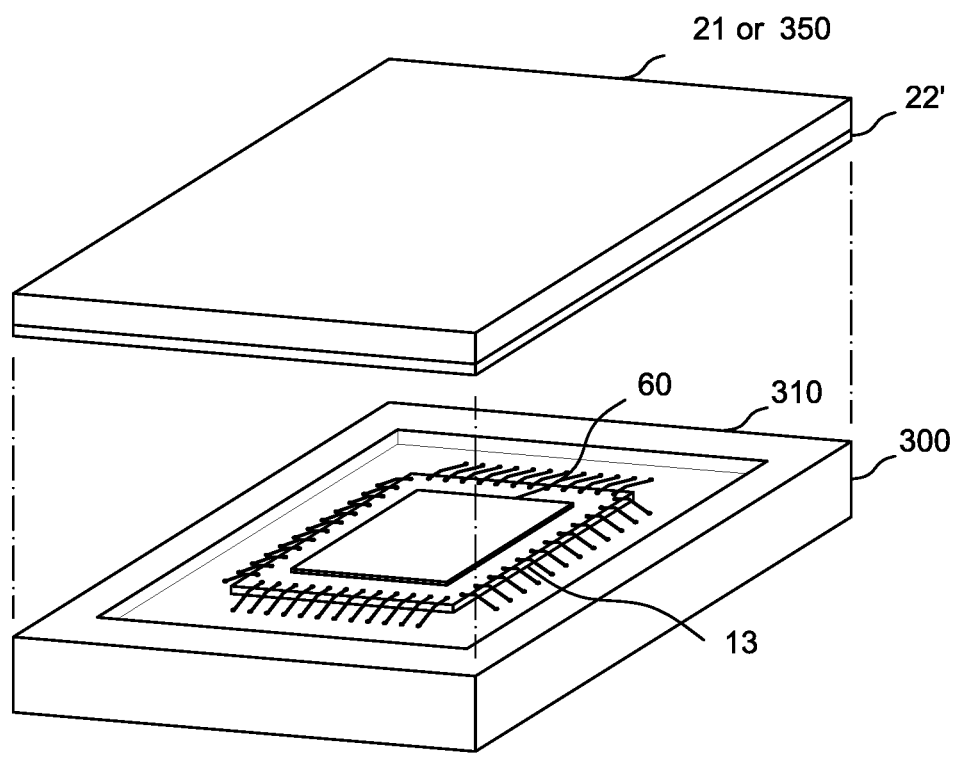
FIG. 19 illustrates a semiconductor package including a prism sheet having a dam structure formed thereon.

FIG. 19 illustrates a semiconductor package including a prism sheet having a dam structure formed thereon.

Referring to FIG. 19, the semiconductor package may include a case 300 in which a semiconductor chip such as the image sensor 13 or the fingerprint image sensor 10' (hereinafter, referred collectively as image sensor 13) is located. The case 300 may be formed of, for example, synthetic resin. A lead frame (not shown) that is made of an electro conductive material such as metal or metal alloy may be arranged inside of the case 300. The lead frame has a plurality of leads, and the plurality of leads extend to outside of the case 300. On a top surface and a bottom surface of the image sensor 13, a plurality of pads configured for receiving electrical signals from the outside or outputting electrical signals to the outside may be formed. The image sensor may be coupled onto the lead frame, and a portion of pads are electrically connected to a portion of leads.

Here, the top structure is, for example, a display panel 21 having a prism surface 22 formed on the bottom surface of the display panel 21, or a display panel 21 including a prism sheet 22' coupled to the bottom surface, or a cover 350, and the semiconductor chip is, for example, the image sensor 13, but not limited to the image sensor.

In one embodiment, the semiconductor package may further include the cover 350 to be coupled to the case 300. The cover 350 may be formed of, for example, synthetic resin. The cover 350 may prevent foreign materials from entering the interior of the semiconductor package. If the semiconductor chip is the image sensor 13, the cover 250 may be made of optically transparent material. In one embodiment, the prism sheet 22' having dam structure may be coupled to a bottom surface of the cover 350. The prism sheet 22' may include a prism surface on which the prism peaks, the prism valleys and the dam structure are formed and a flat surface facing the prism surface. The flat surface may be coupled to the bottom surface of the cover 350 so that the prism surface having dam structure may face the image sensor 13. In another embodiment, the prism surface having dam structure may be formed on the bottom surface of the cover 350.

In another embodiment, the semiconductor package may be coupled to, for example, the bottom surface of the display panel 21. The prism sheet 22' of which the prism surface has the dam structure formed thereon may be coupled to the bottom surface of the display panel 21. The prism surface having dam structure may face the image sensor 13. The case 300 in which the image sensor is arranged may be coupled to the prism surface having dam structure.

In the aforementioned embodiments, the prism sheet 22' may be coupled to the case by a liquid adhesive. Since the prism peaks and valleys that extend laterally are formed on the prism surface of the prism sheet 22', the liquid adhesive may flow in along the prism valleys to an area above the image sensor 13. On the other hand, if there exists a gap in a coupled portion by the liquid adhesive between the prism sheet and the case 300, foreign materials may enter the interior of the semiconductor package. In case that the semiconductor chip is the image sensor 13, the adhesive that flowed in along the prism surface and/or the foreign materials may cause faults in the image sensor or have the image sensor fail to generate a clear image. The dam structure is formed on the prism surface near its lateral surface and is perpendicular to an extending direction of the prism peak.

The dam structure can prevent the adhesive and foreign materials from entering inside of the semiconductor package.

An optic structure 60 is arranged on the top surface of the image sensor 13. The optic structure 60 may include, for example, the optical path extending layer 12 that is optically transparent and the micro lens array 11' consisting of the plurality of micro lenses 11 formed on the optical path extending layer 12.

Figure 20:
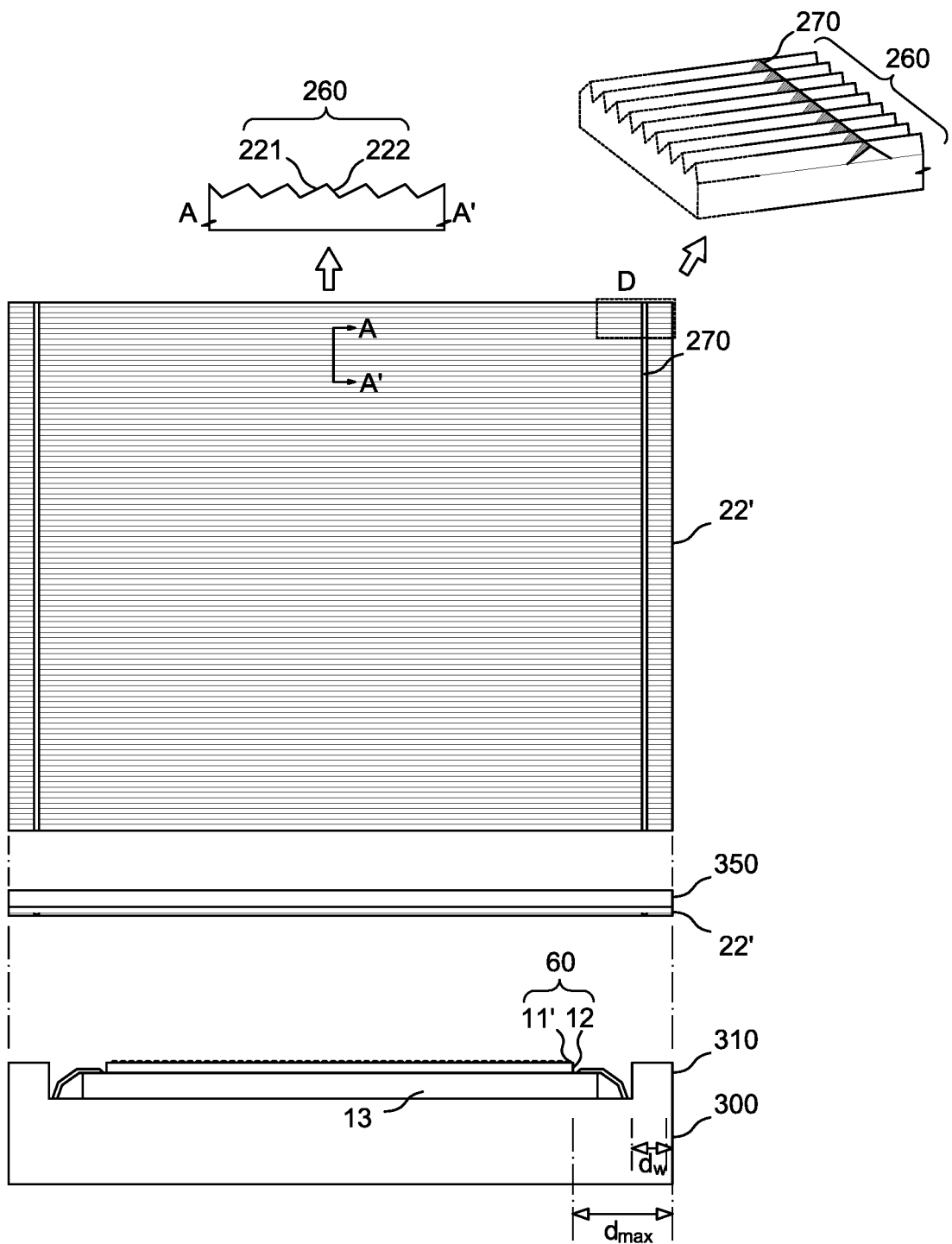
FIG. 20 illustrates one embodiment of the prism sheet having dam structure.

FIG. 20 illustrates one embodiment of the prism sheet having dam structure.

Referring to FIG. 20, the prism sheet 22' having dam structure includes the prism surface on which the prism peaks 260 extend in the lateral direction. The prism peak 260 is formed by the first inclined face 221 and the second inclined face 222. The inclination angles of the first inclined face 221 and the second inclined face 222 may be substantially identical or different from each other. The inclination angle is an angle between the flat surface of the prism sheet 22' and each of inclined faces. The prism peak 260 is formed by coupling a bottom end of the first inclined face 221 and a bottom end of the second inclined face, and the prism valley is formed by coupling a top end of the first inclined face 221 and a top end of the second inclined face. On the prism sheet without dam structure, the prism valley may be a conduit or a path for gas or liquid to flow along the extending direction.

The dam 270 is formed on the prism sheet 22' near its lateral surface and is perpendicular to an extending direction of the prism peak 260. The prism sheet 22' of which prism surface faces the image sensor 13 is coupled to a top surface of wall 310 of the case 300. The wall 310 may be located on the perimeter of the case 300, and the top surface of the wall 310 may be parallel with a bottom surface of the case 300. An outer surface of the wall 310 may be a lateral surface of the case 300, and an inner surface of the wall 310 forms an interior space for accommodating the image sensor 13. In one embodiment, the dam 270 may be formed within an area from the lateral surface of the prism sheet 22' to distance $d_w$ corresponding to a thickness of the wall 310. For example, the dam 270 may be formed to be more close to a location corresponding to the inner surface of the wall 310. As another example, a dimension of the prism sheet 22', for example, length and width may be smaller than that of the wall 310, and thus, the dam 270 may be formed to be more close to the lateral surface of the prism sheet 22'. In still another example, the dam 270 may be formed within an area from the lateral surface to distance $d_{max}$ corresponding to a lateral surface of the optic structure 60 or the image sensor 13, but may not be formed on an area beyond distance $d_{max}$ toward a center of the prism sheet 22'.

The dam is formed within the prism valley. The prism valley extends between each lateral surface of the prism sheet 22'. Accordingly, gas or liquid can flow through the prism valley, and foreign materials also enter the interior of the semiconductor package through the prism valley. The dam 270 formed within the prism valley can block liquid or foreign materials affecting an operation of the image sensor 13 from entering the interior of the semiconductor package. In one embodiment, the dam 270 may be formed to have a height same as that of the prism peak 260. In case that the dam 270 and the prism peak have same height, the dam 270 can block gas and/or liquid from flowing through the prism valley. In another embodiment, the dam 270 may be formed to be higher than the prism peak 260. In case that the dam 270 is higher than the prism peak 260, the dam 270 may be formed more close to the lateral surface of the optic structure 60 or the image sensor 13. In still another embodiment, the dam 270 may be formed to be lower than the prism peak 260.

The dam 270 is formed in a direction substantially perpendicular to the prism peak/valley. In one embodiment, the dam 270 may extend from a top side of the prism sheet 22' to a bottom side of the prism sheet 22'. In another embodiment, the dam 270 may extend from a location close to the top side of the prism sheet 22' to a location close to the bottom side of the prism sheet 22'. Namely, the dam's length in a vertical direction may be equal to or shorter than that of the prism sheet 22'.

Figure 21:
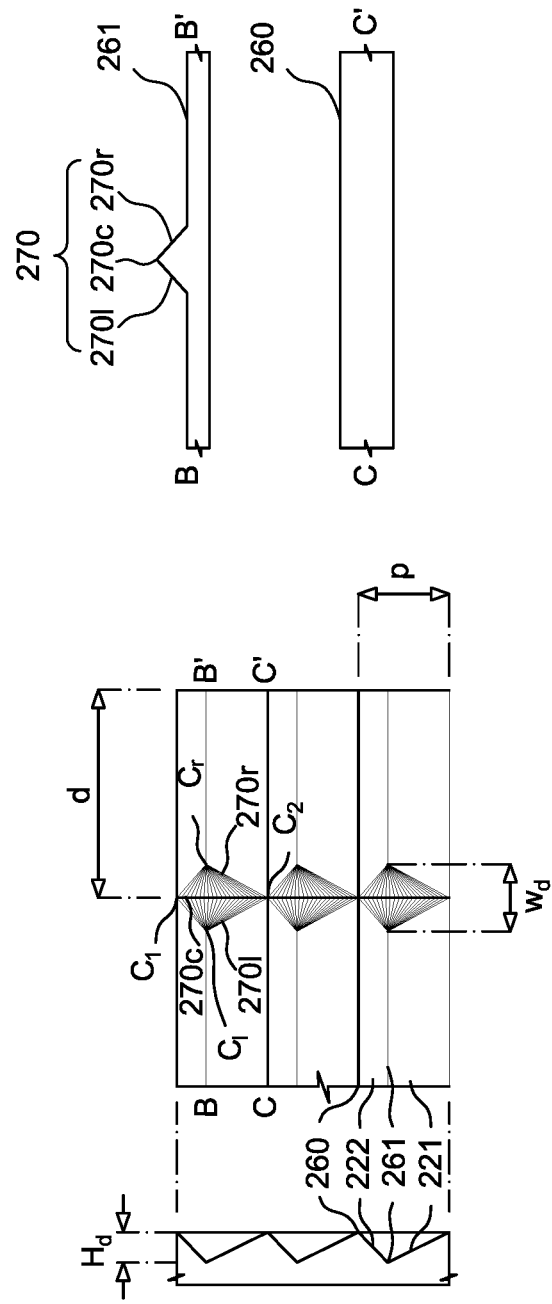
FIG. 21 illustrates the dam structure of the prism sheet.

FIG. 21 illustrates the dam structure of the prism sheet, and shows enlarged view of D in FIG. 20 together with a vertical cross-section and horizontal cross-section of the prism sheet 22'.

Referring to FIG. 21, the prism sheet 22' includes the prism surface and the flat surface facing the prism surface. The prism surface is formed by the first inclined face 221 and the second inclined face 222 that are alternately arranged to form alternately the prism peaks 260 and the prism valleys 261. As described above, the inclination angle of the first inclined face 221 and the second inclined face may be substantially identical or different from each other. In the structure shown in FIG. 21, the inclination angle of the first inclined face 221 is smaller than the inclination angle of the second inclined face 222. When distance between two prism peaks 260 is P, the prism valley 261 is not located on an intermediate location spaced equally from two prism peaks 260 by P/2. Although not shown, in case that the inclination angle of the first and the second inclined face 221, 222 are substantially identical, the prism valley may be located on the intermediate location spaced equally from two prism peaks 260 by P/2.

The dam 270 may be formed to be spaced from the lateral surface of the prism sheet 22', for example, a right lateral surface by distance d. In one embodiment, distance d may be between 0 and $d_w$. Here, $d_w$ is a thickness of the wall 310 in a lateral direction. In another embodiment, distance d may be between 0 and $d_{max}$. Here, $d_{max}$ is a distance between the outer surface of the case 300 and the lateral surface of the image sensor 13.

The dam 270 includes two triangular surfaces 2701, 270r sharing a single side $C_1$-$C_2$. Two triangular surfaces 2701, 270r extend from a center line 270c to the prism valley 261. The center line 270c is substantially perpendicular to the extending direction of the prism peak 260 or the prism valley 261. Intersections between two prism peaks 260 and the center line 270c are two vertexes $C_1$, $C_2$ of the triangular surfaces 2701, 270r, and remaining vertexes $C_l$, $C_r$ are located on the prism valleys 261 respectively. In one embodiment, a distance between $C_l$ and $C_r$ is $w_d$, and a distance from the center line 270c to $C_l$ and $C_r$ is $w_d/2$. Accordingly, a cross-section of prism sheet 22' along the prism valley 261 (line B-B') may be in a form of the equilateral triangular dam 270 of which bottom side is located on the prism valley 261. On the other hand, a cross-section of the prism sheet 22' along the prism peak 260 (line C-C') may be rectangular. In another embodiment, distances from the center line 270c to $C_l$ and $C_r$ may be different from each other.

Figure 22A:
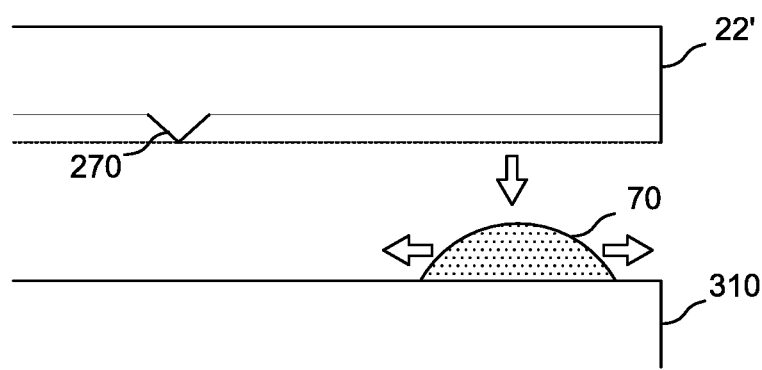
FIGS. 22A and 22B illustrate a process of attaching the case of the semiconductor case to the prism sheet shown in FIG. 20.
Figure 22B:
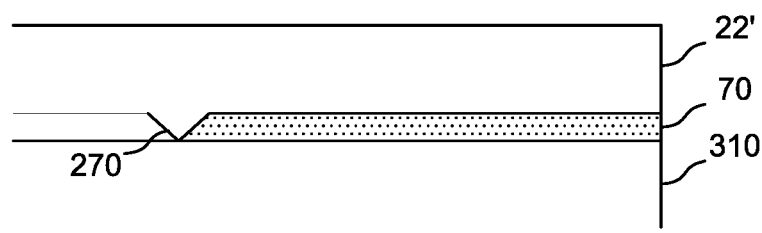

FIGS. 22A and 22B illustrate a process of attaching the case of the semiconductor case to the prism sheet shown in FIG. 20.

In FIG. 22A, the case 300 is coupled to the prism sheet 22' by use of a liquid adhesive 70. A certain amount of adhesive 70 is applied to the wall 310 of the case 300. The prism sheet 22' is lowered toward the wall 310.

In FIG. 22B, once the prism surface of the prism sheet 22' contacts the adhesive 70, the adhesive 70 that is pressed by the prism sheet 22' is spread in the lateral direction. Most of adhesive 70 fills the prism valleys and excess of adhesive moves in a direction toward the center of the prism sheet 22' along the prism valleys. The dam 270 prevents the adhesive 70 from moving toward the center of the prism sheet 22' along the prism valleys. Thus, with reference to FIG. 22B, the prism valleys on the right side of the dam are, at least in part, filled with the adhesive 70, but the prism valleys on the left side of the dam are free from the adhesive. Then, once UV or heat is applied, the adhesive becomes hardened so the case 300 is coupled firmly to the prism sheet 22'.

In a prism sheet without dam structure, the adhesive 70 may flow toward the center of the prism sheet along the prism valleys. The adhesive 70 that flowed in the prism sheet may affect the operation of the image sensor 13. On the contrary, the prism sheet 22' having dam structure can not only prevent inflow of adhesive but also seal the semiconductor package tightly. Accordingly, foreign materials cannot enter the interior of the semiconductor package.

Figure 23:
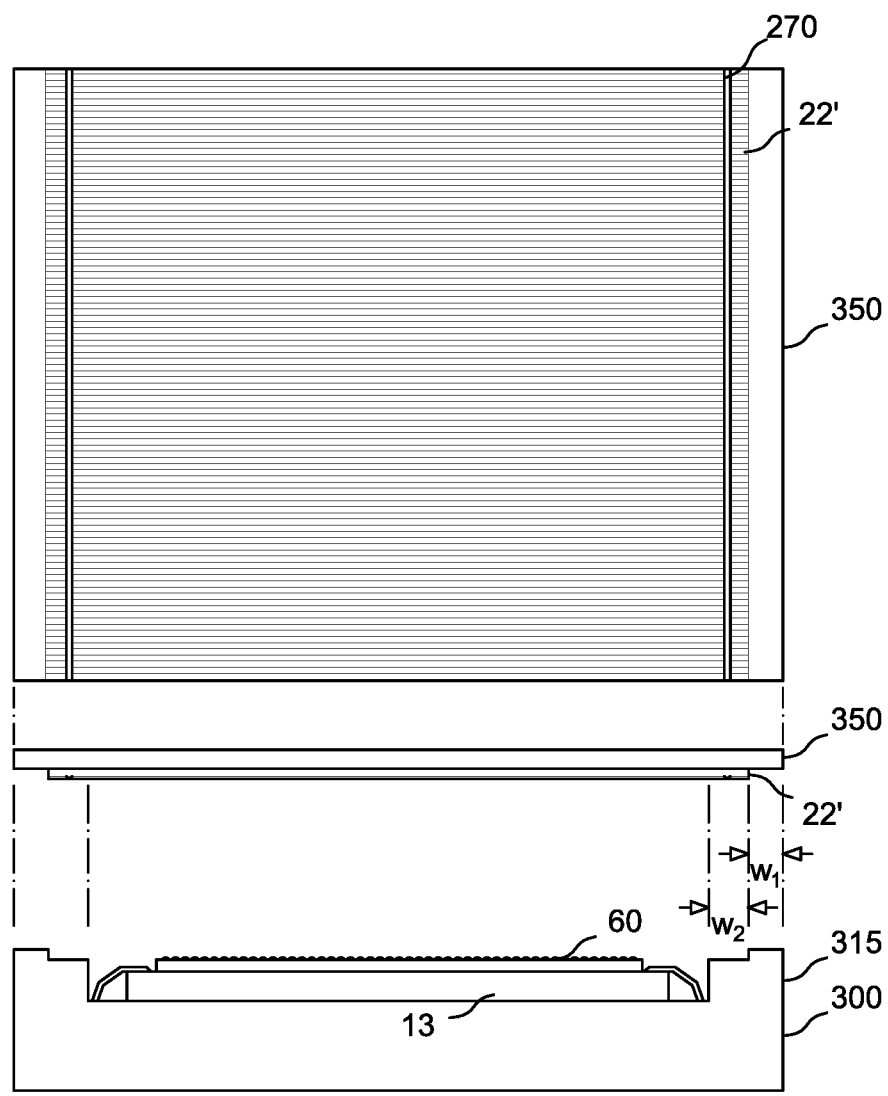
FIG. 23 illustrates another embodiment of the prism sheet having dam structure.
Figure 24A:
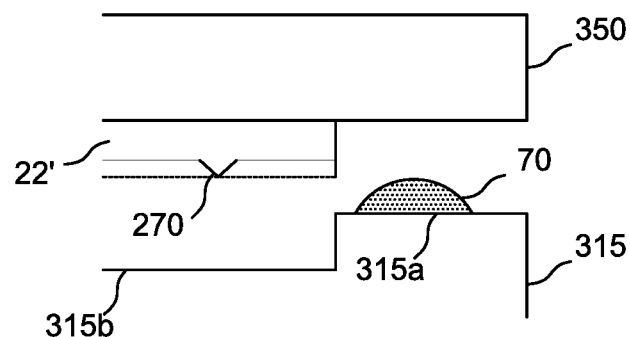
FIGS. 24A, 24B and 24C illustrate a process of coupling the case of the semiconductor package to the prism sheet shown in FIG. 23.
Figure 24B:
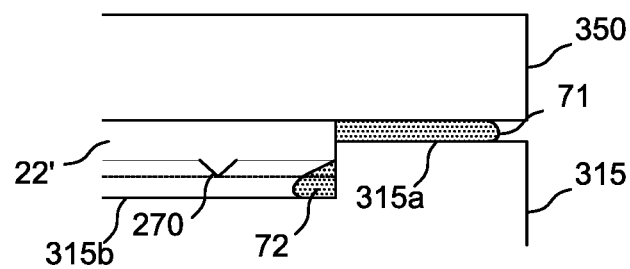
Figure 24C:
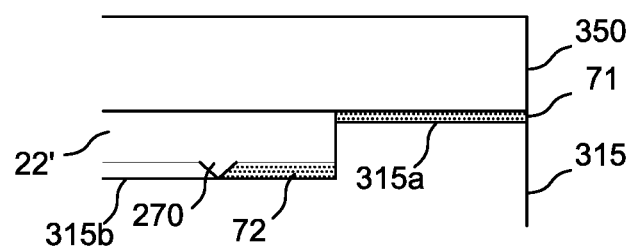

FIG. 23 illustrates another embodiment of the prism sheet having dam structure, and FIGS. 24A, 24B and 24C illustrate a process of coupling the case of the semiconductor package to the prism sheet shown in FIG. 23. Same description already described with reference to FIG. 20 will be omitted.

Referring to FIG. 23, the wall 315 of the case 300 includes the first top surface 315a and the second top surface 315b. The first top surface 315a and the second top surface 315b are parallel in the lateral direction, and the first top surface 315a is higher than the second top surface 315b. The height difference between the first and the second top surfaces 315a, 315b may be equal to or larger than at least a thickness of the prism sheet 22', for example, a distance between the prism peak and the flat surface of the prism sheet 22'. The width of the first top surface 315a is $w_1$ and the width of the second top surface $w_2$. The length of the prism sheet 22' in the lateral direction is smaller than the length of the cover 350 in the lateral direction. In FIG. 23, the right lateral surface of the prism sheet 22' is located on the left side of the right lateral surface of the cover 350 to be spaced at least by distance di. Thus, an area on the bottom surface of the cover 350 between the right lateral surface of the cover 350 and the right lateral surface of the prism sheet 22' (e.g., the area corresponding to width $w_1$) may be arranged to contact the first top surface 315a of the wall 315, and an area on the prism surface of the prism sheet 22' from the right lateral surface to width $w_2$ may be arranged to contact the second top surface 315b of the wall 315.

Referring to FIG. 24A, a certain amount of adhesive 70 is applied on the first top surface 315a of the case 300. The cover 350 and the prism sheet 22' coupled to the bottom surface of the cover 350 is lowered toward the wall 315. Although not shown, the adhesive 70 may be applied on the second top surface 315b only, or both the first top surface 315a and the second top surface 315b.

Referring FIGS. 24B and 24C, when the bottom surface of the cover 250 contacts the adhesive 70, the adhesive 70 that is pressed by the prism sheet 22' is spread in the lateral direction. A portion of adhesive pressed by the bottom surface of cover 350 may reach the second top surface 315B. The first portion 71 of the adhesive 70 is spread throughout the first top surface 315a, and the second portion 72 of the adhesive 70 is spread throughout the second top surface 315b. Most of the second portion 72 fills the prism valleys and excess of the second portion 72 moves in the direction toward the center of the prism sheet 22'. The dam 270 prevents the second portion 72 from moving toward the center of the prism sheet 22' along the prism valleys. Thus, the prism valleys on the right side of the dam are, at least in part, filled with the adhesive 70, but the prism valleys on the left side of the dam are free from the adhesive. Then, once UV or heat is applied, the adhesive becomes hardened so the case 300 is coupled firmly to the prism sheet 22'.

Figure 25:
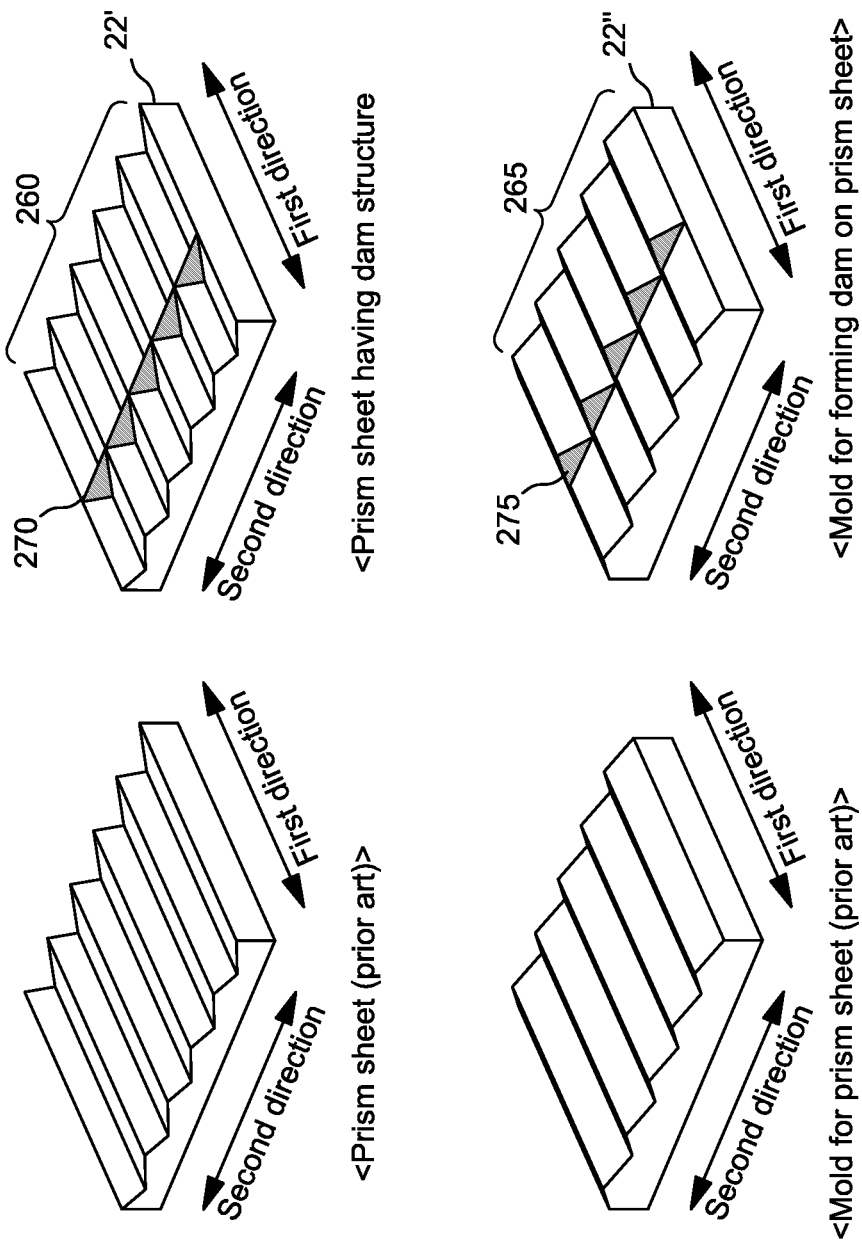
FIG. 25 illustrates a prism sheet mold.

FIG. 25 illustrates a prism sheet mold.

Referring to FIG. 25, an engraved prism surface 265 for the prism surface is formed in the extending direction of the prism peak/valley (the first direction) and an engraved dam 275 in the direction perpendicular to the extending direction (the second direction) are formed on the prism sheet mole 22" for manufacturing the prism sheet having dam structure. The engraved dam 275 may be formed by removing some of an embossed portion of the engraved prism surface 265.

Figure 26A:
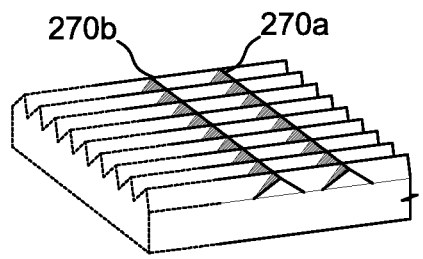
FIGS. 26A, 26B and 26C illustrate another embodiment of the prism sheets having dam structure.
Figure 26B:
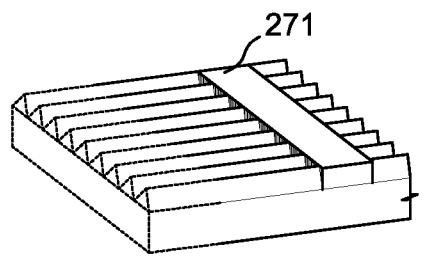
Figure 26C:
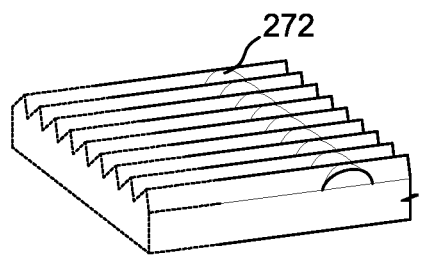

FIGS. 26A, 26B and 26C illustrate another embodiments of the prism sheets having dam structure.

In FIG. 26A, a plurality of dams 110a, 110b may be formed on the prism surface. The plurality of dams 270a, 270b may be formed to be perpendicular to the extending direction of the prism peak/valley, and spaced by a certain distance. The heights of the plurality of dams 270a, 270b may be substantially identical or different from each other. In addition, in case that more than three dams are formed, the distances between dams may be substantially identical or different from each other.

In FIG. 26B, a cross-section of dam 271 may be a polygon, for example, a rectangle, and in FIG. 26C, a cross-section of dam 272 may be a semi-circle. The shapes of dam in FIGS. 26B and 26C may be determined by cross-sections of the engraved dam. Compared to the dam 270 shown in FIG. 20, a top surface of the dam 271 may be a narrow strip perpendicular to the extending direction of the prism peak/valley. In one embodiment, the top surface of the dam 271 may be parallel with the flat surface of the prism sheet 22'. In another embodiment, the top surface of the dam 271 may be formed to be inclined. In still another embodiment, a groove extending from the top surface of the dam toward inside of the dam 271 may be formed.

The above description of the invention is exemplary, and those skilled in the art can understand that the invention can be modified in other forms without changing the technical concept or the essential feature of the invention. Therefore, it should be understood that the above-mentioned embodiments are exemplary in all respects, but are not definitive.

The scope of the invention is defined by the appended claims, not by the above detailed description, and it should be construed that all changes or modifications derived from the meanings and scope of the claims and equivalent concepts thereof are included in the scope of the invention.

What is claimed is:
1. A semiconductor package, comprising:
a case having a wall configured for surrounding a space in which a semiconductor chip is installed; and
a prism sheet having a prism surface consisting of a plurality of prism peaks and a plurality of prism valleys and a flat surface facing the prism surface, wherein the prism surface faces the semiconductor chip and the flat surface is coupled to a cover, wherein a dam extending in a direction different from an extending direction of the prism peak is formed on the prism surface.

2. The semiconductor package of claim 1, wherein the extending direction of the dam is perpendicular to the extending direction of the prism peak.

3. The semiconductor package of claim 1, wherein the dam is formed in the plurality of prism valleys.

4. The semiconductor package of claim 1, wherein the dam is formed close to a lateral surface of the prism sheet.

5. The semiconductor package of claim 1, wherein a height of the dam is the same as a height of the prism peak.

6. The semiconductor package of claim 1, wherein a cross-section of the dam is a triangle.

7. The semiconductor package of claim 1, wherein a cross-section of the dam is a rectangle.

8. The semiconductor package of claim 1, wherein a length of the dam in the extending direction is shorter than the prism sheet.

9. The semiconductor package of claim 1, wherein the semiconductor chip is an image sensor.

10. The semiconductor package of claim 1 further comprising:
   an optical path extending layer arranged on a top surface of the semiconductor chip; and
   a micro lens array arranged on a top surface of the optical path extending layer.

11. The semiconductor package of claim 1, wherein the plurality of prism peak and the plurality of prism valleys are formed by a plurality of first inclined faces and a plurality of second inclined faces that are alternately arranged, wherein an inclination angle of the first inclined face and an inclination angle of the second inclined face are different from each other.

* * * * *